US012659335B2

(12) United States Patent
Maeda et al.

(10) Patent No.: US 12,659,335 B2
(45) **Date of Patent: *Jun. 16, 2026**

(54) FRAUD DETECTION METHOD, FRAUD DETECTION DEVICE, AND RECORDING MEDIUM

(71) Applicant: Panasonic Intellectual Property Corporation of America, Torrance, CA (US)

(72) Inventors: Manabu Maeda, Osaka (JP); Takeshi Kishikawa, Osaka (JP); Daisuke Kunimune, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/917,154

(22) Filed: Oct. 16, 2024

(65) Prior Publication Data

US 2025/0039212 A1 Jan. 30, 2025

Related U.S. Application Data

(63) Continuation of application No. 16/583,996, filed on Sep. 26, 2019, now Pat. No. 12,155,677, which is a
(Continued)

(51) Int. Cl.
*H04L 9/40* (2022.01)
*H04L 12/40* (2006.01)

(52) U.S. Cl.
CPC .... *H04L 63/1425* (2013.01); *H04L 12/40026* (2013.01); *H04L 63/1466* (2013.01);
(Continued)

(58) Field of Classification Search
CPC ........... H04L 12/40026; H04L 63/1416; H04L 63/1425; H04L 63/1466; H04L 67/12;
(Continued)

(56) References Cited

U.S. PATENT DOCUMENTS

2007/0115957 A1* 5/2007 Noirie ................... H04L 49/254
370/386
2010/0131816 A1* 5/2010 Yamamoto .......... H04L 12/4013
709/204
(Continued)

FOREIGN PATENT DOCUMENTS

JP 2019-068253 4/2019
WO 2014/115455 7/2014
WO 2016/080422 5/2016

OTHER PUBLICATIONS

H.M. Song et al. "Intrusion Detection System based on the analysis of time intervals of CAN messages for in-vehicle network," 2016 International Conference on Information Networking (ICOIN), 2016, pp. 63-68. (Year: 2016).*
(Continued)

*Primary Examiner* — Jeremy S Duffield
(74) *Attorney, Agent, or Firm* — Wenderoth, Lind & Ponack, L.L.P.

(57) ABSTRACT

A fraud detection method includes: determining whether a period of a message repeatedly transmitted in an in-vehicle network is anomalous; detecting whether arbitration occurs when the message is transmitted in the in-vehicle network; and determining that the message is an anomalous message, in the case where the period of the message is anomalous and no arbitration occurs when the message is transmitted in the in-vehicle network.

21 Claims, 14 Drawing Sheets

Related U.S. Application Data continuation of application No. PCT/JP2018/044568, filed on Dec. 4, 2018.

(52) U.S. Cl.
CPC .............. *H04L 2012/40215* (2013.01); *H04L 2012/40273* (2013.01)

(58) Field of Classification Search
CPC ........... H04L 2012/40215; H04L 2012/40273; H04W 12/12
See application file for complete search history.

(56) References Cited

U.S. PATENT DOCUMENTS

| | | | |
|---|---|---|---|
| 2011/0029704 A1 | 2/2011 | Itou | |
| 2014/0328352 A1* | 11/2014 | Mabuchi | H04L 12/4035 370/451 |
| 2015/0358351 A1* | 12/2015 | Otsuka | H04L 12/66 726/23 |
| 2016/0188396 A1* | 6/2016 | Sonalker | G06F 11/079 714/37 |
| 2016/0359893 A1* | 12/2016 | Kishikawa | H04L 67/12 |
| 2017/0013005 A1* | 1/2017 | Galula | H04L 63/1425 |
| 2017/0026386 A1* | 1/2017 | Unagami | H04L 12/40032 |
| 2017/0324579 A1* | 11/2017 | Takada | H04L 12/40052 |
| 2017/0324675 A1* | 11/2017 | Takada | H04L 12/40163 |
| 2018/0091533 A1 | 3/2018 | Yajima | |
| 2019/0104204 A1* | 4/2019 | Kawakami | H04L 63/00 |

OTHER PUBLICATIONS

International Search Report (ISR) issued on Mar. 5, 2019 in International (PCT) Application No. PCT/JP2018/044568.

Extended European Search Report dated Apr. 21, 2021 in counterpart European Patent Application No. 18910237.9.

Yajima et al., "A New Attack Detection Technique for Periodic CAN Messages and its Evaluation Method", Abstracts of 2017 Symposium on Cryptography and Information Security, The Institute of Electronics, Information and Communication Engineers, Jan. 27, 2017, pp. 1-8, with partial English translation, 14 pages.

H.M. Song, H.R. Kim and H.K. Kim, "Intrusion detection system based on the analysis of time intervals of CAN messages for in-vehicle network," 2016 International Conference on Information Networking (ICOIN), 2016, pp. 63-68. (Year: 2016).

* cited by examiner

FIG. 1

| RECEPTION ID LIST |
|:---:|
| 1 |
| 2 |
| 3 |
| 4 |

| TRANSFER SOURCE | TRANSFER DESTINATION | ID |
|:---:|:---:|:---:|
| BUS 200a | BUS 200b | * |
| BUS 200b | BUS 200a | 3 |

FIG. 7A

MESSAGE M2    MESSAGE M1

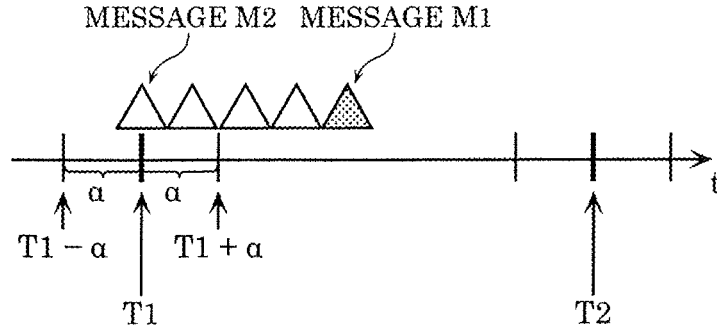

FIG. 7B

MESSAGE M4

MESSAGE M5      MESSAGE M3

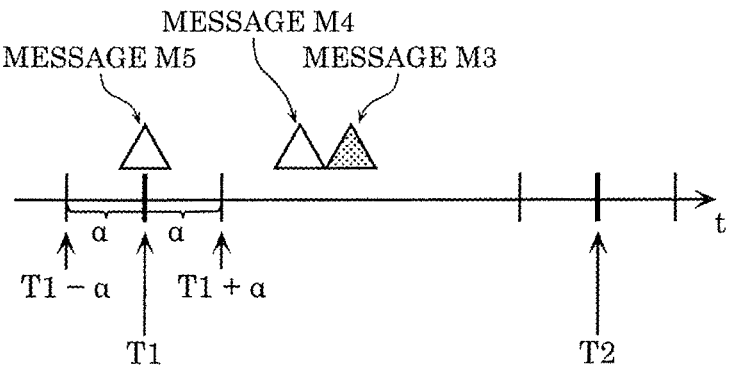

FIG. 8

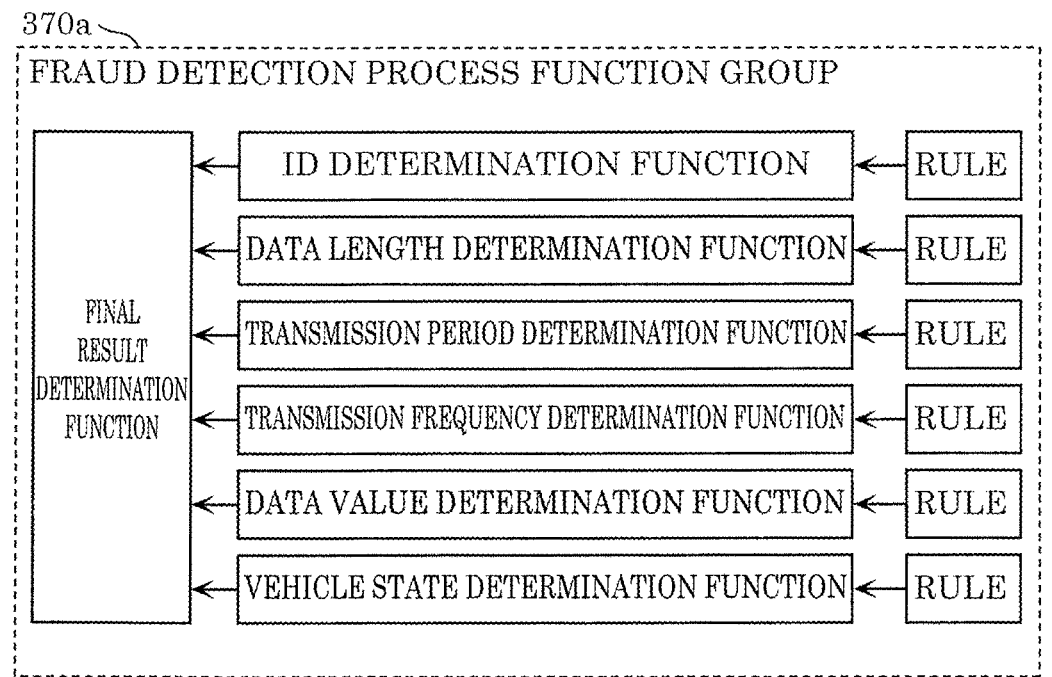

370a

FRAUD DETECTION PROCESS FUNCTION GROUP

FINAL RESULT DETERMINATION FUNCTION

| | |
|---|---|
| ID DETERMINATION FUNCTION | RULE |
| DATA LENGTH DETERMINATION FUNCTION | RULE |
| TRANSMISSION PERIOD DETERMINATION FUNCTION | RULE |
| TRANSMISSION FREQUENCY DETERMINATION FUNCTION | RULE |
| DATA VALUE DETERMINATION FUNCTION | RULE |
| VEHICLE STATE DETERMINATION FUNCTION | RULE |

FRAUD DETECTION METHOD, FRAUD DETECTION DEVICE, AND RECORDING MEDIUM

CROSS REFERENCE TO RELATED APPLICATIONS

This application is a U.S. continuation of U.S. application Ser. No. 16/583,996, filed Sep. 26, 2019, which is a U.S. continuation application of PCT International Patent Application Number PCT/JP2018/044568 filed on Dec. 4, 2018, claiming the benefit of priority of Japanese Patent Application Number 2018-064431 filed on Mar. 29, 2018, the entire contents of which are hereby incorporated by reference.

BACKGROUND

1. Technical Field

The present disclosure relates to a fraud detection method and the like for detecting an anomalous message in an in-vehicle network.

2. Description of the Related Art

Systems in automobiles in recent years include many devices called electronic control units (ECUs). A communication network connecting these ECUs is called an in-vehicle network. There are a number of communication standards for in-vehicle networks. One of the dominant standards for in-vehicle networks is a Controller Area Network (CAN).

In a network conforming to the CAN standard (CAN network), a communication path (bus) is composed of two cables, and each ECU connected to a bus is also referred to as a node. Each node connected to a bus transmits/receives data in a unit called a frame or a message. In CAN, no identifier indicating a transmission destination or a transmission source of data is used.

A node transmitting a frame (transmission node) transmits (i.e. transmits a signal to a bus), for each message, the message with an ID called a message ID indicating the type of the message. A node receiving a message (reception node) receives (i.e. reads a signal from a bus) only a message including a predetermined message ID. A message of the same ID is transmitted with a constant period.

As mentioned above, many ECUs included in a system in an automobile are each connected to a CAN network and operate while communicating various messages with each other.

There is a possibility that an ECU capable of communicating with the outside of the CAN network is, for example through fraudulent access from the outside, fraudulently controlled to transmit an anomalous message (attack message) to the CAN network. Such a fraudulently controlled ECU (fraudulent ECU) can, for example, masquerade (spoof) as another ECU and transmit an anomalous message to fraudulently control the vehicle. A method of detecting such spoofing attack is disclosed in International Patent Application Publication No. 2014/115455 as an example.

SUMMARY

However, the method disclosed in International Patent Application Publication No. 2014/115455 has a problem in that correct determination cannot be made in the case where the transmission period of the normal message increases in length due to a disturbance of the transmission period on the CAN network bus.

To solve the problem stated above, the present disclosure has an object of providing a fraud detection method, a fraud detection device, and the like for determining whether each individual message transmitted to a bus is an anomalous message.

To solve the problem stated above, a fraud detection method according to an aspect of the present disclosure is a fraud detection method for detecting an anomalous message in an in-vehicle network system, the fraud detection method including: determining whether a period of a message repeatedly transmitted in the in-vehicle network system is anomalous; detecting whether arbitration occurs when the message is transmitted in the in-vehicle network system; and determining that the message is an anomalous message, in the case where the period of the message is anomalous and no arbitration occurs when the message is transmitted in the in-vehicle network system.

These general and specific aspects may be implemented using a system, a device, a method, an integrated circuit, a computer program, or a non-transitory computer-readable recording medium such as CD-ROM, or any combination of systems, devices, methods, integrated circuits, computer programs, and recording media.

A fraud detection method according to an aspect of the present disclosure, for example, can determine whether each individual message transmitted to a bus is an anomalous message.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a block diagram illustrating an overall structure of an in-vehicle network system in Embodiment 1;

FIG. 7A is a diagram illustrating a message reception pattern upon occurrence of arbitration in Embodiment 1;

FIG. 7B is another diagram illustrating a message reception pattern upon occurrence of arbitration in Embodiment 1;

FIG. 8 is a block diagram illustrating another example of a fraud detection process function group in Embodiment 1;

FIG. 9 is a block diagram illustrating an example of an ECU included in the in-vehicle network system in Embodiment 1;

FIG. 16 is a block diagram illustrating an example of an ECU in a variation;

FIG. 18 is a block diagram illustrating an example of an ECU in a variation.

Figure 2:
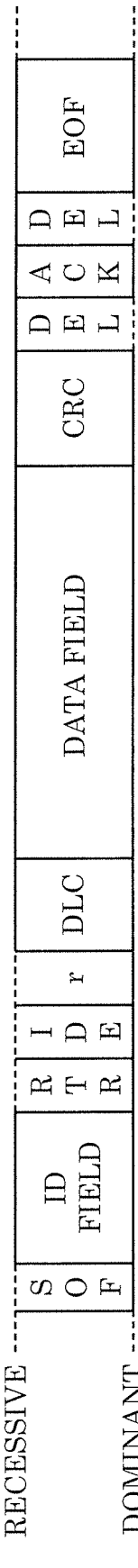
FIG. 2 is a diagram illustrating a format of a message (data frame) in a CAN protocol in Embodiment 1.

DETAILED DESCRIPTION OF THE EMBODIMENTS (Underlying Knowledge Forming Basis of the Present Disclosure)

In the case where many ECUs are connected on a CAN network, if each ECU independently attempts to transmit a message, the message transmission timings are likely to be the same.

The CAN network has a function called "arbitration" to deal with such a situation. With this function, a message with a smaller ID is preferentially transmitted, while a message with a greater ID waits to be transmitted. In this case, the transmission timing at which the message is transmitted becomes off. Consequently, the function of determining whether the message is normal or anomalous depending on the message transmission interval does not work properly, and there is a possibility that a normal message is determined as an anomalous message.

A fraud detection method according to an aspect of the present disclosure is a fraud detection method for detecting an anomalous message in an in-vehicle network system, the fraud detection method being executed by an information processing system including a storage, and including: determining whether a period of a message repeatedly transmitted in the in-vehicle network system is anomalous; detecting whether arbitration occurs when the message is transmitted in the in-vehicle network system; and determining that the message is an anomalous message, in the case where the period of the message is anomalous and no arbitration occurs when the message is transmitted in the in-vehicle network system.

Thus, in the case where a transmission delay of the message transmitted in the in-vehicle network system occurs due to arbitration or the like, whether the received message is a normal message can be determined appropriately. Hence, whether each individual message is an anomalous message can be determined with higher accuracy.

For example, the fraud detection method may include deciding a time used as a start point of the period subjected to the determining of whether the period of the message repeatedly transmitted in the in-vehicle network is anomalous, to be a reception time or a scheduled reception time of the message, wherein the determining of whether the period of the message repeatedly transmitted in the in-vehicle network is anomalous includes determining the period using, as the start point, the time decided in the deciding.

Thus, even in the case where there are a plurality of message transmission methods upon occurrence of arbitration, whether each individual message is an anomalous message can be determined with higher accuracy by determining whether the message is a normal message based on a feature that appears in the reception time of the message.

For example, the fraud detection method may include determining a transmission type of the message, wherein the deciding includes deciding the time used as the start point to be the reception time or the scheduled reception time of the message, depending on the transmission type.

Thus, arbitration detection can be performed depending on the transmission type of the message transmitted in the in-vehicle network.

For example, the detecting may include detecting that arbitration occurs in the case where the message is included in one or more successively received messages from another message received at a time within a normal range of the period with which the message is received.

Thus, even in the case where a transmission delay of the message occurs due to arbitration or the like, whether the received message is a normal message can be determined appropriately.

A fraud detection device according to an aspect of the present disclosure is a fraud detection device that detects an anomalous message in an in-vehicle network system, the fraud detection device including: one or more processors; and a storage, wherein the one or more processors, using the storage: determine whether a period of a message repeatedly transmitted in the in-vehicle network system is anomalous; detect whether arbitration occurs when the message is transmitted in the in-vehicle network system; and determine that the message is a normal message, in the case where the period of the message is anomalous and arbitration occurs when the message is transmitted in the in-vehicle network system.

Thus, even in the case where a transmission delay of the message transmitted in the in-vehicle network system occurs due to arbitration or the like, whether the message is a normal message can be determined appropriately. Hence, whether each individual message is an anomalous message can be determined with higher accuracy.

A recording medium according to an aspect of the present disclosure is a non-transitory computer-readable recording medium having recorded thereon a computer program for causing the one or more processors in the fraud detection device to perform any of the foregoing fraud detection methods.

Thus, even in the case where a transmission delay of the message transmitted in the in-vehicle network system occurs due to arbitration or the like, whether the message is a normal message can be determined appropriately. Hence, whether each individual message is an anomalous message can be determined with higher accuracy.

Embodiments will be described in detail below, with reference to drawings.

The embodiments described below each show a general or specific example. The numerical values, shapes, materials, structural elements, the arrangement and connection of the structural elements, steps, the processing order of the steps etc. shown in the following embodiments are mere examples, and do not limit the scope of the present disclosure. Of the structural elements in the embodiments described below, the structural elements not recited in any one of the independent claims representing the broadest concepts are described as optional structural elements.

Embodiment 1

1. Overview

This embodiment describes the case where whether a transmitted message is an anomalous message is determined in an in-vehicle network system, with reference to drawings. Herein, "anomalous message" is basically a fraudulent (unauthorized) message.

1.1 Overall Structure of In-Vehicle Network System

Figure 1:
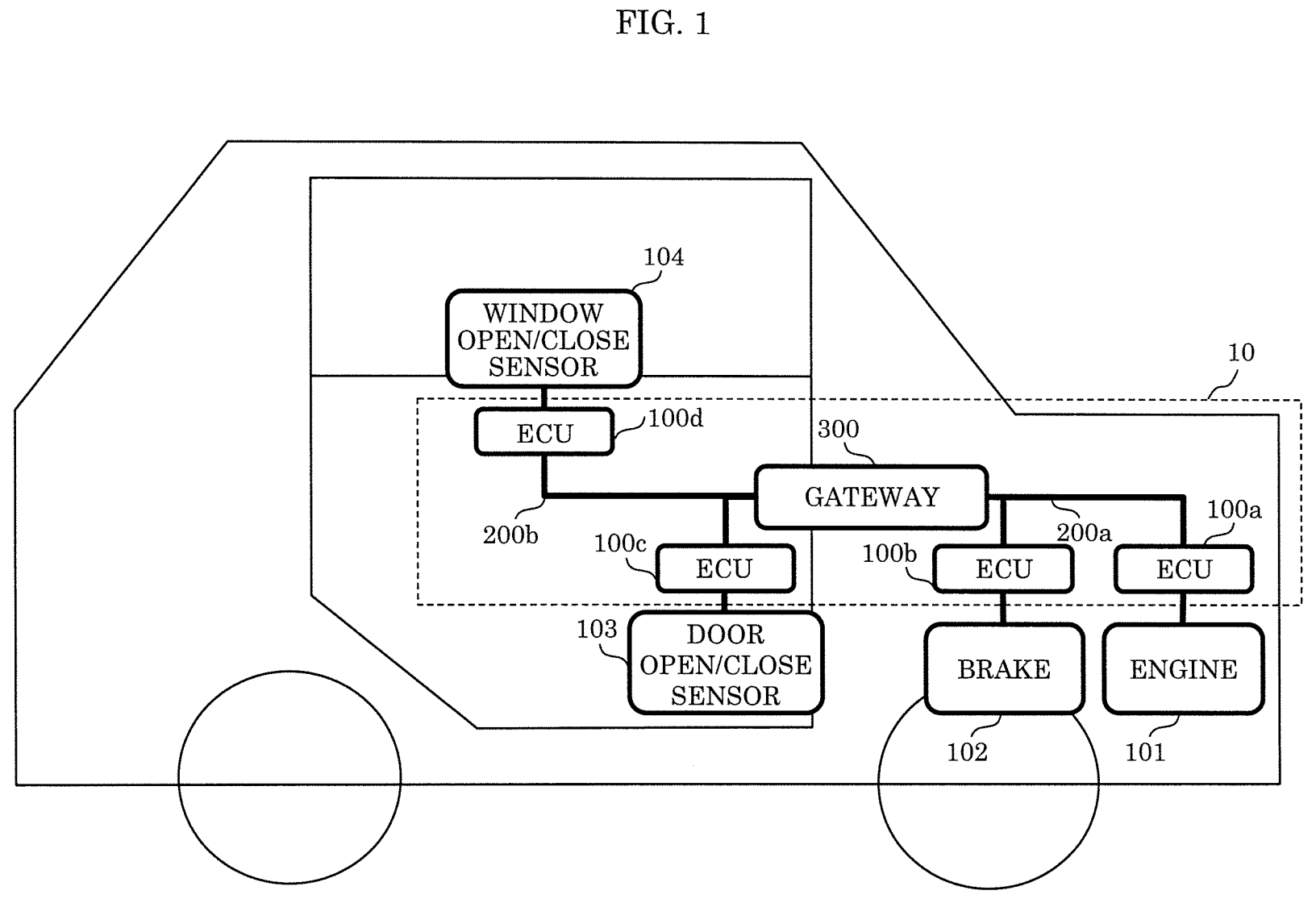

FIG. 1 is a block diagram illustrating an overall structure of in-vehicle network system 10 in this embodiment.

In FIG. 1, in-vehicle network system 10 is formed by a CAN network, and includes ECUs 100a, 100b, 100c, and 100d, buses 200a and 200b, and gateway 300.

Hereafter, ECUs 100a, 100b, 100c, and 100d are also collectively referred to as "ECUs 100", and any of ECUs 100a, 100b, 100c, and 100d is also referred to as "ECU 100".

Hereafter, buses 200a and 200b are also collectively referred to as "buses 200", and any of buses 200a and 200b is also referred to as "bus 200".

ECU 100a is connected to engine 101. ECU 100b is connected to brake 102. ECU 100c is connected to door open/close sensor 103. ECU 100d is connected to window open/close sensor 104.

Each ECU 100 obtains the state of the connected device, and periodically transmits a message representing the obtained state to bus 200. For example, ECU 100a obtains the rotational frequency of engine 101, and transmits a message including a data value representing the rotational frequency with a predetermined ID to bus 200.

Each ECU 100 also reads a message transmitted from any other ECU 100 from bus 200, and selectively receives the message depending on the ID accompanying the message. This selective reception will be described later.

Gateway 300 connects bus 200a to which ECUs 100a and 100b are connected and bus 200b to which ECUs 100c and 100d are connected. Gateway 300 has a function of transferring a message received from one bus to the other bus. Gateway 300 is also one node in the CAN network.

In-vehicle network system 10 is an example of applications of a fraudulent communication detection system and the like for determining whether a message is an anomalous message, and the applications of the fraudulent communication detection system and the like are not limited to in-vehicle network system 10. The fraudulent communication detection system and the like may be applied to various network systems using local area network (LAN) and the like or distributed databases.

1.2 Data Format of Message

FIG. 2 is a diagram illustrating a format of a message (data frame) in a CAN protocol. A message in a standard ID format in the CAN protocol is illustrated in the drawing.

The message is composed of start of frame (SOF), ID field, remote transmission request (RTR), IDE (identifier extension), reserved bit (r), data length code (DLC), data field, CRC (cyclic redundancy check) sequence, CRC delimiter (the left DEL in the drawing), ACK (acknowledgement) slot, ACK delimiter (the right DEL in the drawing), and EOF (end of frame).

The SOF is a 1-bit dominant. The term "dominant" means superior. Dominant denotes a state in which, in a CAN network using digital mode for data communication, a voltage is applied to two cables forming a bus so as to transmit the value "0", or the transmitted value "0". Meanwhile, recessive denotes a state in which a voltage is applied to two cables forming a bus so as to transmit the value "1", or the transmitted value "1". The term "recessive" means inferior. In the case where the value "0" and the value "1" are simultaneously transmitted from two nodes to the bus, the value "0" is given higher priority. The bus during idle time is in a recessive state. Each ECU 100 starts message transmission by changing the state of bus 200 from recessive to dominant, and other ECUs 100 read this change to perform synchronization. In FIG. 2, each part in which the line indicating dominant or recessive in the message is a solid line is a part that can indicate the value of dominant or recessive. SOF is fixed at the dominant state, and accordingly the line indicating dominant is a solid line and the line indicating recessive is a dashed line.

The ID is an 11-bit value indicating the type of data included in the message. CAN is designed so that, in communication arbitration between messages which a plurality of nodes simultaneously start to transmit, a message with a smaller value of ID is given higher priority.

The RTR is a 1-bit dominant indicating that the frame is a message (data frame).

The IDE is a 1-bit dominant.

The DLC is a 4-bit value indicating the length of the following data field.

The data field is a value indicating the contents of the transmitted data, and has the maximum length of 64 bits, with the length being adjustable in units of 8 bits. The specifications relating to allocation of the transmitted data to this part depend on the vehicle type or manufacturer.

The CRC sequence is a 15-bit value calculated from the transmission values of the SOF, the ID field, the control field, and the data field.

The CRC delimiter is a separator indicating the end of the CRC sequence, and is fixed at a 1-bit recessive. The reception node compares the result of calculation from the values of the SOF, the ID field, the control field, and the data field in the received message with the value of the CRC sequence, to determine anomaly.

The ACK slot is 1 bit long. The transmission node transmits a recessive in this part. If the reception node has succeeded in normal reception up to the CRC sequence, the reception node transmits a dominant as an acknowledgment. Since a dominant is given higher priority, if communication of one message has been normally performed up to the CRC sequence, bus 200 during the transmission of the ACK slot is a dominant.

The ACK delimiter is a separator indicating the end of the ACK slot, and is fixed at a 1-bit recessive.

The EOF indicates the end of the message, and is fixed at a 7-bit recessive.

1.3 Structure of Gateway

Figure 3:
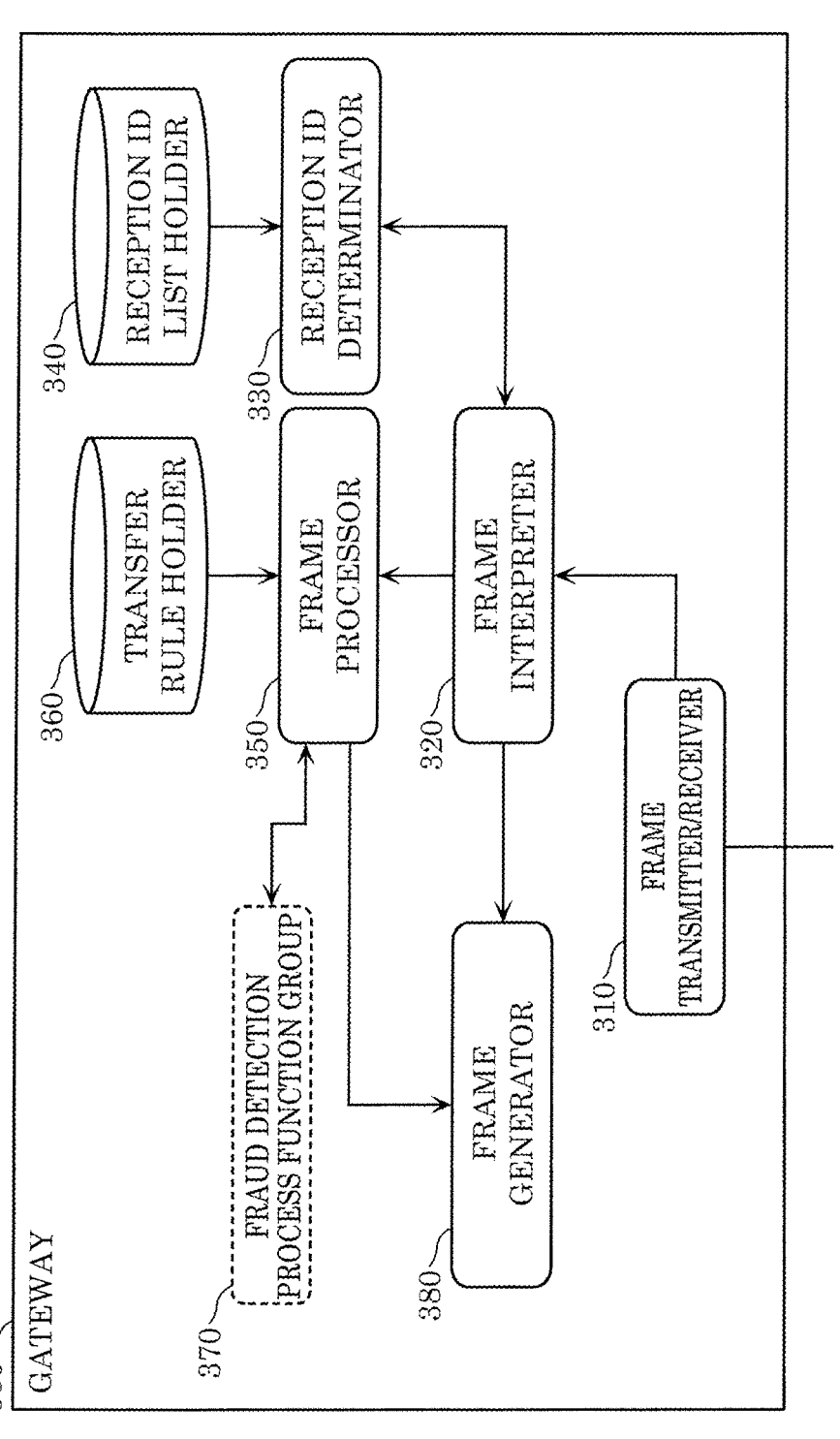
FIG. 3 is a block diagram illustrating a structure of a gateway included in the in-vehicle network system in Embodiment 1.

FIG. 3 is a block diagram illustrating a structure of gateway 300 included in in-vehicle network system 10 in this embodiment. In FIG. 3, gateway 300 includes frame transmitter/receiver 310, frame interpreter 320, reception ID determinator 330, reception ID list holder 340, frame processor 350, transfer rule holder 360, fraud detection process function group 370, and frame generator 380.

These structural elements are structural elements representing functions, and gateway 300 is provided, for example, as an information processing device including a processing unit implemented by a processor, a storage implemented by semiconductor memory and the like, an input/output unit implemented by an input/output port, etc.

The structural elements representing functions are achieved by the processing unit reading a program stored in the storage, executing the program, and recording predetermined data in the storage. Alternatively, the structural elements representing functions may be achieved by, instead of recording predetermined data in the storage, transmitting/receiving data through the input/output unit. The structural elements representing functions may be achieved by combining these two methods.

Frame transmitter/receiver 310 transmits/receives a message conforming to the CAN protocol to each of buses 200a and 200b.

More specifically, frame transmitter/receiver 310 reads a message transmitted to bus 200 per 1 bit, and transfers the read message to frame interpreter 320.

Frame transmitter/receiver 310 also transmits a message to each of buses 200a and 200b per 1 bit, depending on bus information transmitted from frame generator 380.

Frame transmitter/receiver 310 transmits a message received from bus 200a to bus 200b and transmits a message received from bus 200b to bus 200a, thus transferring messages between buses 200.

Frame interpreter 320 receives the values of the message from frame transmitter/receiver 310, and maps the values to the fields in the CAN protocol to interpret the received message. Frame interpreter 320 transfers the set of values interpreted as the value of the ID field to reception ID determinator 330.

Frame interpreter 320 also decides whether to transfer the value of the ID field and the data field subsequent to the ID field in the message to frame processor 350 or stop receiving the message, depending on a determination result notified from reception ID determinator 330.

In the case where frame interpreter 320 determines that the received message does not conform to the CAN protocol, frame interpreter 320 requests frame generator 380 to transmit an error frame.

The error frame is a frame in a predetermined format defined in the CAN protocol, which is different from the foregoing message. The error frame is transmitted from a node in the case where an error occurs in the CAN network. When the error frame is transmitted to a bus, message transmission in the network is discontinued.

In the case where frame interpreter 320 interprets that an error frame transmitted from another node is received, frame interpreter 320 abandons the message being read.

Reception ID determinator 330 receives the value of the ID field from frame interpreter 320, and determines whether to receive the read message according to a list of message IDs held in reception ID list holder 340. Reception ID determinator 330 notifies frame interpreter 320 of the determination result.

Figures 4, 5, 6:
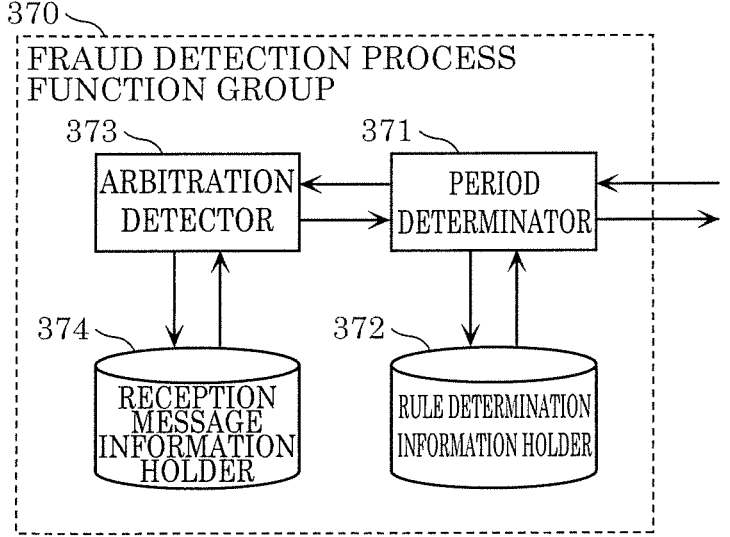
FIG. 4 is a diagram illustrating an example of a reception ID list in Embodiment 1.
FIG. 5 is a diagram illustrating an example of a transfer rule in Embodiment 1.
FIG. 6 is a block diagram illustrating an example of a fraud detection process function group in Embodiment 1.

Reception ID list holder 340 holds the list of message IDs (reception ID list) to be received by gateway 300. FIG. 4 is a diagram illustrating an example of the reception ID list in this embodiment. The reception ID list in FIG. 4 will be described in detail later.

Frame processor 350 decides, according to a rule relating to data transfer held in transfer rule holder 360, bus 200 as a transfer destination depending on the ID of the received message, and notifies frame generator 380 of bus 200 as a transfer destination, the message ID notified from frame interpreter 320, and the data to be transferred.

Frame processor 350 also provides the message received from frame interpreter 320 to fraud detection process function group 370, and requests fraud detection process function group 370 to determine whether the message is an anomalous message. Frame processor 350 does not transfer any message that is determined as an anomalous message by fraud detection process function group 370.

Transfer rule holder 360 holds the rule relating to data transfer of each bus 200 (hereafter also referred to as a transfer rule). FIG. 5 is a diagram illustrating an example of the transfer rule in this embodiment. The transfer rule in FIG. 5 will be described in detail later.

Fraud detection process function group 370 is a function group that determines whether the message being received is an anomalous message. The functional structural elements included in fraud detection process function group 370 will be described in detail later.

Frame generator 380 generates an error frame and causes frame transmitter/receiver 310 to transmit the error frame, in response to an error frame transmission request from frame interpreter 320.

Frame generator 380 also generates a message frame using a message ID and data received from frame processor 350, and transmits the message frame to frame transmitter/receiver 310 together with bus information.

1.4 Reception ID List

FIG. 4 is a diagram illustrating an example of the reception ID list in this embodiment. The reception ID list is a list of message IDs of messages to be received and processed by gateway 300.

In FIG. 4, the reception ID list has a message ID in each row. The reception ID list in FIG. 4 has message IDs "1", "2", "3", and "4", and gateway 300 receives messages of these message IDs. Gateway 300 stops reception of messages of message IDs not included in the reception ID list.

The ID values and the number of IDs included in the reception ID list are an example for illustrative purposes, and the structure of the reception ID list used in gateway 300 is not limited to such.

1.5 Transfer Rule

FIG. 5 is a diagram illustrating an example of the transfer rule in this embodiment. In FIG. 5, the transfer rule has, in each row, a combination of a message transfer source bus and transfer destination bus and a transfer target message ID.

Specifically, the first row of the transfer rule includes transfer source "bus 200a", transfer destination "bus 200b", and ID "*", indicating a rule that gateway 300 transfers a message received from bus 200a to bus 200b regardless of the ID. The second row of the transfer rule includes transfer source "bus 200b", transfer destination "bus 200a", and ID "3", indicating a rule that gateway 300 transfers a message received from bus 200b to bus 200a if the ID of the message is "3".

1.6 Structure of Fraud Detection Process Function Group

FIG. 6 is a block diagram illustrating an example of fraud detection process function group 370 included in gateway 300 in this embodiment. In FIG. 6, fraud detection process function group 370 includes period determinator 371, rule determination information holder 372, arbitration detector 373, and reception message information holder 374.

These structural elements represent functions, and are achieved by the processing unit reading a program stored in the storage in gateway 300, executing the program, and recording predetermined data in the storage. Alternatively, the structural elements may be achieved by, instead of recording predetermined data in the storage, transmitting/receiving data through the input/output unit. The structural elements may be achieved by combining these two methods.

Period determinator 371 determines, for each message having the same ID, whether the period (elapsed time) with which the message is received is within a range that can be determined as normal.

Period determinator 371 obtains the message ID from a message received from frame processor 350, and obtains information necessary to determine the period relating to the ID. Specifically, period determinator 371 obtains a rule and a last reception time from rule determination information holder 372.

Period determinator 371 calculates the difference between the time at which the current message is received and the last reception time obtained from rule determination information holder 372, and determines whether the difference value (elapsed time) is within the range indicated by the rule obtained from rule determination information holder 372.

Period determinator 371 determines OK in the case where the elapsed time is within the range indicated by the rule, and NG in the case where the elapsed time is outside the range indicated by the rule.

The rule may be information of the upper limit and the lower limit of the elapsed time from the last reception of a message of the same ID. The rule may be information of a reference value of the elapsed time and the width of the range determined as OK from the reference time.

Although period determinator 371 determines whether the difference between the time at which the message is received and the last reception time is within the range indicated by the rule, the determination by period determinator 371 is not limited to such. For example, period determinator 371 may add the elapsed time range indicated by the rule to the last reception time to calculate an expected reception time range, and determine whether the reception time of the currently received message is within the expected reception time range.

Moreover, period determinator 371 inquires of arbitration detector 373 whether arbitration occurs when the message is received. Period determinator 371 obtains, from arbitration detector 373, information indicating whether arbitration occurs and, in the case where arbitration occurs, the start time of the arbitration.

In the case where period determinator 371 determines NG, if arbitration occurs, period determinator 371 changes the determination to OK in the case where the start time of the arbitration is earlier than the upper limit of the range indicated by the rule, i.e. the start time of the arbitration is less in value than the upper limit of the range indicated by the rule. If arbitration does not occur, period determinator 371 maintains the determination as NG.

Period determinator 371 may inquire of arbitration detector 373 whether arbitration occurs, each time a message is received. Period determinator 371 may inquire of arbitration detector 373 whether arbitration occurs, only when the determination based on the rule obtained from rule determination information holder 372 is NG.

In the case where period determinator 371 inquires of arbitration detector 373 whether arbitration occurs only when the determination based on the rule obtained from rule determination information holder 372 is NG, each time a message is received, period determinator 371 notifies arbitration detector 373 of the reception time of the message, or stores the reception time in reception message information holder 374.

If arbitration detector 373 detects that arbitration occurs, period determinator 371 may change the determination to OK in the case where the reception time of the message is less than the reference value of the elapsed time.

In the case where the determination is OK, period determinator 371 notifies rule determination information holder 372 of the reception time of the message received at the time.

Rule determination information holder 372 holds the rule and the reception time of a message for each ID included in the message, which are used by period determinator 371. The rule may be information of the upper limit and the lower limit of the elapsed time from the last reception of a message of the same ID. The rule may be information of a reference value of the elapsed time and the width of the range determined as OK from the reference value of the elapsed time.

Arbitration detector 373 detects, in response to the inquiry from period determinator 371, whether arbitration occurs when the message is received. FIGS. 7A and 7B are each a diagram illustrating a message reception pattern upon occurrence of arbitration in this embodiment. In FIGS. 7A and 7B, each triangle represents a message, the horizontal axis represents time, T1 and T2 each represent a scheduled time of message reception, and a represents the width of the range within which determination based on the rule obtained from rule determination information holder 372 is OK.

In FIGS. 7A and 7B, for example, time (T1−α) is the lower limit at which period determinator 371 determines OK at time T1, and time (T1+α) is the upper limit at which period determinator 371 determines OK at time T1.

Messages M1 and M3 are each a message expected to be received at time T1 by period determinator 371. Messages M2 and M4 are each a message at which arbitration is started. Arbitration detector 373 notifies period determinator 371 of the reception time of message M2 or M4 as the start time of the arbitration.

Arbitration detector 373 determines that arbitration occurs, when a message is received at less than or equal to a time interval set beforehand. For example, in FIG. 7A, messages are successively transmitted from message M2 to message M1, so that arbitration detector 373 determines that arbitration occurs from message M2 to message M1. In FIG. 7B, the time interval between message M4 and message M5 received at time T1 before message M4 is wide, so that arbitration detector 373 determines that arbitration occurs from message M4.

In FIG. 6, arbitration detector 373 receives the reception time of the message from period determinator 371, obtains the reception time of the last message stored in reception message information holder 374, and determines whether arbitration occurs. In the case where arbitration detector 373 determines that arbitration occurs, arbitration detector 373 obtains, from reception message information holder 374, arbitration occurrence state information indicating whether arbitration occurs. In the case where the obtained arbitration occurrence state information indicates that no arbitration occurs, arbitration detector 373 holds the reception time of the message in reception message information holder 374 as the arbitration start time. Arbitration detector 373 also holds the reception time of the current message in reception message information holder 374 as the reception time of the last message, and holds the arbitration occurrence state information in reception message information holder 374.

In the case where period determinator 371 inquires of arbitration detector 373 whether arbitration occurs, arbitration detector 373 determines, from the reception time of the message, whether arbitration occurs. In the case where arbitration occurs, arbitration detector 373 obtains the arbitration start time from reception message information holder 374, and notifies period determinator 371 of the arbitration start time together with the determination result that arbitration occurs. In the case where no arbitration occurs, arbitration detector 373 notifies period determinator 371 of only the determination result that no arbitration occurs.

Although the above describes the case where arbitration detector 373 notifies only the determination result that no arbitration occurs in the case where no arbitration occurs, this is not a limitation. For example, arbitration detector 373 may notify a value indicating the arbitration start time together with the determination result, or notify the arbitration start time of the last arbitration.

Reception message information holder 374 holds the reception time of the last message, the arbitration occurrence state information, and the arbitration start time used by arbitration detector 373.

Although the above describes the case where fraud detection process function group 370 is a function group for performing period determination, the fraud detection process function group is not limited to such. FIG. 8 is a diagram illustrating another example of fraud detection process function group 370 in this embodiment, i.e. a variation of fraud detection process function group 370. In FIG. 8, fraud detection process function group 370a includes six types of determination functions. Specifically, as determination functions, fraud detection process function group 370a includes an ID determination function which is a function of checking the ID field of the message, a data length determination function which is a function of checking the data length of the message, a transmission period determination function which is a function of checking the period (time interval) with which the message is transmitted, a transmission frequency determination function which is a function of checking the frequency with which the message is transmitted, and a data value determination function which is a function of checking the value (data value) of the data field of the message, and further includes a vehicle state determination function which is a function of checking the vehicle state by recognizing the vehicle state based on the determination results, the transmission period, the frequency, the data value, the data value change amount, etc. of these determination functions. Fraud detection process function group 370a further includes a comprehensive determination function of comprehensively determining whether the received message is an anomalous message from the determination results of these determination functions. The result of the comprehensive determination function is taken to be the result of fraud detection by fraud detection process function group 370a.

Period determinator 371, rule determination information holder 372, arbitration detector 373, and reception message information holder 374 in fraud detection process function group 370 in FIG. 6 may be incorporated in the transmission period determination function of fraud detection process function group 370a in FIG. 8.

These structural elements represent functions, and are achieved by the processing unit reading a program stored in the storage in gateway 300, executing the program, and storing predetermined data in the storage or transmitting/receiving data through the input/output unit. The structural elements may be achieved by combining these two methods.

1.7 Structure of ECU

Figure 9:
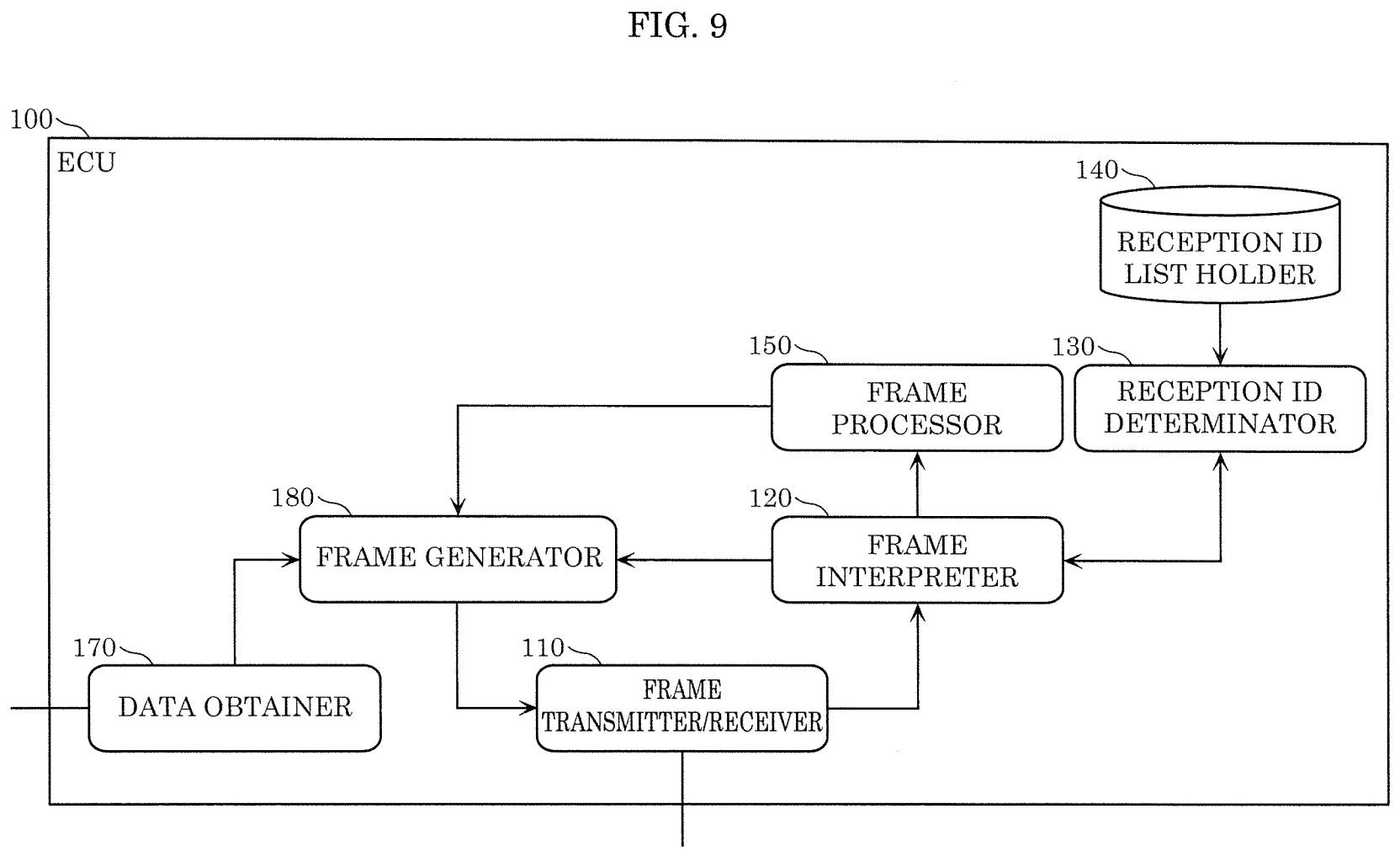

FIG. 9 is a block diagram illustrating an example of ECU 100 included in in-vehicle network system 10 in this embodiment. In FIG. 9, ECU 100 includes frame transmitter/receiver 110, frame interpreter 120, reception ID determinator 130, reception ID list holder 140, frame processor 150, data obtainer 170, and frame generator 180.

These structural elements are structural elements representing functions, and ECU 100 is provided, for example, as an information processing device including a processing unit implemented by a processor, a storage implemented by semiconductor memory and the like, an input/output unit implemented by an input/output port, etc.

The structural elements representing functions are achieved by the processing unit reading a program stored in the storage, executing the program, and storing predetermined data in the storage or transmitting/receiving data through the input/output unit. The structural elements may be achieved by combining these two methods.

Frame transmitter/receiver 110 transmits/receives a message conforming to the CAN protocol to bus 200.

More specifically, frame transmitter/receiver 110 reads a message transmitted to bus 200 per 1 bit, and transfers the read message to frame interpreter 120.

Frame transmitter/receiver 110 also transmits a message notified from frame generator 180, to bus 200.

Frame interpreter 120 receives the values of the message from frame transmitter/receiver 110, and maps the values to the fields in the CAN protocol to interpret the message. Frame interpreter 120 transfers the set of values interpreted as the value of the ID field to reception ID determinator 130.

Frame interpreter 120 also decides whether to transfer the value of the ID field and the data field subsequent to the ID field in the message to frame processor 150 or stop receiving the message, depending on a determination result notified from reception ID determinator 130.

In the case where frame interpreter 120 determines that the received message does not conform to the CAN protocol, frame interpreter 120 requests frame generator 180 to transmit an error frame.

In the case where frame interpreter 120 determines that an error frame transmitted from another node is received, frame interpreter 120 abandons the message being read.

Reception ID determinator 130 receives the value of the ID field from frame interpreter 120, and determines whether to receive the read message according to a list of message IDs held in reception ID list holder 140. Reception ID determinator 130 notifies frame interpreter 120 of the determination result.

Reception ID list holder 140 holds a reception ID list to be received by ECU 100. The reception ID list is in the same form as that in FIG. 4, and accordingly its description is omitted.

Frame processor 150 performs a process depending on the data of the received message. The process differs among ECUs 100.

For example, ECU 100a performs a process for outputting alarm sound, when receiving a message indicating that the door is open while the speed per hour of the automobile exceeds 30 km. ECU 100c performs a process for outputting alarm sound, when the door opens while receiving a message indicating that the brake is not applied.

These processes are merely an example for illustrative purposes, and ECU 100 may perform a process other than these processes. Frame processor 150 causes frame generator 180 to generate a frame transmitted in order to perform such a process.

Data obtainer 170 obtains data indicating the state of a device connected to ECU 100 or output data indicating a measurement value by a sensor or the like, and transfers the obtained data to frame generator 180.

Frame generator 180 generates an error frame and transmits the error frame to frame transmitter/receiver 110, in response to an error frame transmission request from frame interpreter 120.

Frame generator 180 also generates a message frame with a message ID set beforehand for the value of the data received from data obtainer 170, and transmits the message frame to frame transmitter/receiver 110.

1.8 Fraud Detection Process

Figure 10:
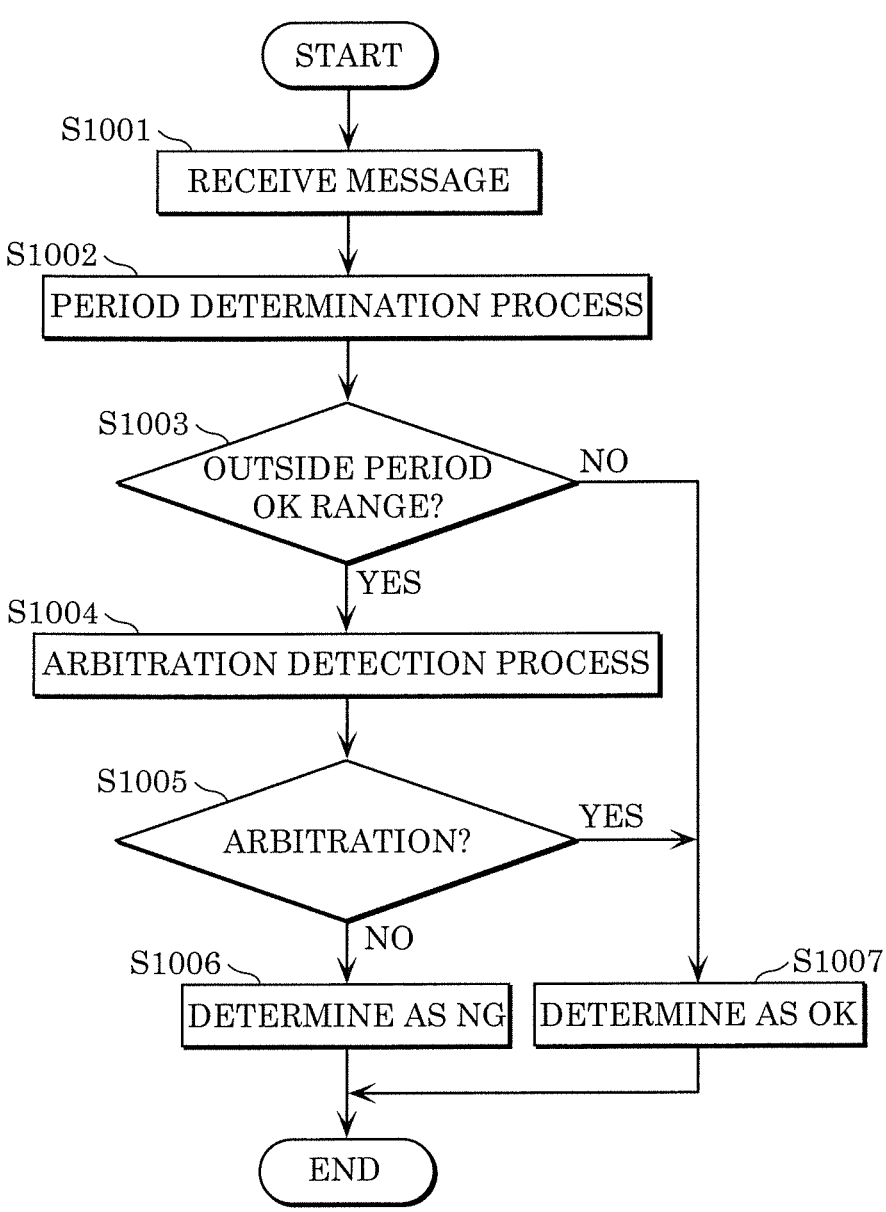
FIG. 10 is a flowchart illustrating an example of a fraud detection process in Embodiment 1.

FIG. 10 is a flowchart illustrating an example of a fraud detection process in this embodiment.

First, period determinator 371 in fraud detection process function group 370 receives a message from frame processor 350 (Step S1001).

Period determinator 371 determines, for the received message, whether the period (elapsed time) with which the message is received with respect to a message having the same ID is within a range that can be determined as normal (Step S1002).

In the case where the received message is outside the range that can be determined as normal (Step S1003: Yes), period determinator 371 advances to Step S1004. In the case where the received message is within the range that can be determined as normal (Step S1003: No), period determinator 371 advances to Step S1007.

In the case where period determinator 371 determines in Step S1003 that the received message is outside the range that can be determined as normal (Step S1003: Yes), arbitration detector 373 detects whether arbitration occurs when the message is received (Step S1004).

In the case where arbitration occurs when the message is received (Step S1005: Yes), arbitration detector 373 advances to Step S1007. In the case where no arbitration occurs when the message is received (Step S1005: No), arbitration detector 373 advances to Step S1006.

In the case where arbitration detector 373 detects in Step S1005 that arbitration does not occur (Step S1005: No), period determinator 371 determines that the received message is not a normal message, i.e. the received message is an anomalous message (Step S1006). The fraud detection process in fraud detection process function group 370 then ends.

In the case where period determinator 371 determines in Step S1003 that the received message is within the range that can be determined as normal (Step S1003: No) or in the case where arbitration detector 373 detects in Step S1005 that arbitration occurs when the message is received (Step S1005: Yes), period determinator 371 determines that the received message is a normal message (Step S1007). The fraud detection process in fraud detection process function group 370 then ends.

1.9 Transfer Process

Figure 11:
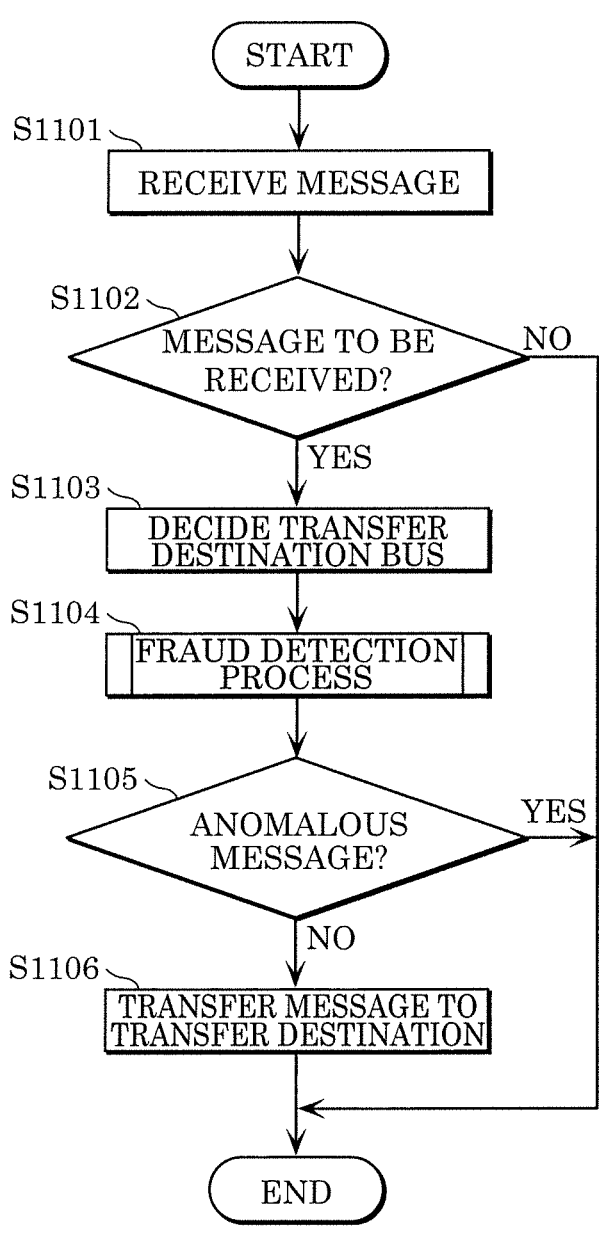
FIG. 11 is a flowchart illustrating an example of a transfer process in Embodiment 1.

FIG. 11 is a flowchart illustrating an example of a transfer process in this embodiment. The transfer process performed by gateway 300 is substantially the same regardless of the transfer direction. Hence, an example in which gateway 300 transfers a message received from bus 200*a* to bus 200*b* will be described below.

First, frame transmitter/receiver 310 reads a message from bus 200*a* (Step S1101). Frame transmitter/receiver 310 notifies frame interpreter 320 of the data of each field in the read message.

Next, frame interpreter 320 in cooperation with reception ID determinator 330 determines, from the value (message ID) of the ID field of the read message, whether the message is to be received and processed (Step S1102). In the case where frame interpreter 320 determines that the message is not to be processed (Step S1102: No), the message is not transferred.

In the case where frame interpreter 320 determines in Step S1102 that the message is to be received and processed (Step S1102: Yes), frame interpreter 320 transfers the value of each field in the message to frame processor 350. Frame processor 350 then decides the transfer destination bus according to the transfer rule held in transfer rule holder 360 (Step S1103).

Frame processor 350 notifies fraud detection process function group 370 of the value of each field in the message received from frame interpreter 320, and requests fraud detection process function group 370 to determine whether the message is an anomalous message. Fraud detection process function group 370 determines whether the notified message is an anomalous message from the value of each field in the notified message, and notifies frame processor 350 of the determination result (Step S1104).

In the case where fraud detection process function group 370 determines in Step S1104 that the message is an anomalous message (Step S1105: Yes), the message is not transferred.

In the case where fraud detection process function group 370 determines in Step S1104 that the message is not an anomalous message but a normal message (Step S1105: No), frame processor 350 requests frame generator 380 to transfer the message to the transfer destination bus decided in Step S1103.

In response to the request from frame processor 350, frame generator 380 generates the message so as to be received by the designated transfer destination, and causes frame transmitter/receiver 310 to transmit the message (Step S1106).

Although the above describes the case where the determination of whether the received message is an anomalous message (Step S1104) is performed after the decision of the transfer destination of the received message (Step S1103), this is not a limitation. The decision of the transfer destination of the received message may be performed after the determination of whether the received message is an anomalous message. The decision of the transfer destination of the received message and the determination of whether the received message is an anomalous message may be performed in parallel.

1.10 Advantageous Effects

According to this embodiment, fraud detection process function group 370 monitors messages on the network in the in-vehicle network system, and, in the case where a message is received with a delay, i.e. not with a predetermined period, determines whether the delay is caused by arbitration to determine whether the message is an anomalous message. A conventional fraud detection technique such as a technique of determining that fraud occurs when a message is received with a time interval shorter than a predetermined period has difficulty in determining whether a message is a normal message or an anomalous message in some cases. Even for such a message, whether the message is an anomalous message can be determined with higher accuracy according to this embodiment. This enhances the safety of the in-vehicle network system.

Embodiment 2

2. Overview

In Embodiment 2, fraud detection process function group 370b is used instead of fraud detection process function group 370 in Embodiment 1. In fraud detection process function group 370b, the period determinator uses the detection result of arbitration detector 373 when deciding the reception time of the message notified to the rule determination information holder. Such fraud detection process function group 370b may be included in gateway 300 instead of fraud detection process function group 370 in FIG. 3 in Embodiment 1.

The gateway including fraud detection process function group 370b and the in-vehicle network system including the gateway are basically the same as those in Embodiment 1, and accordingly the description of their structures is omitted.

2.1 Structure of Fraud Detection Process Function Group

Figure 12:
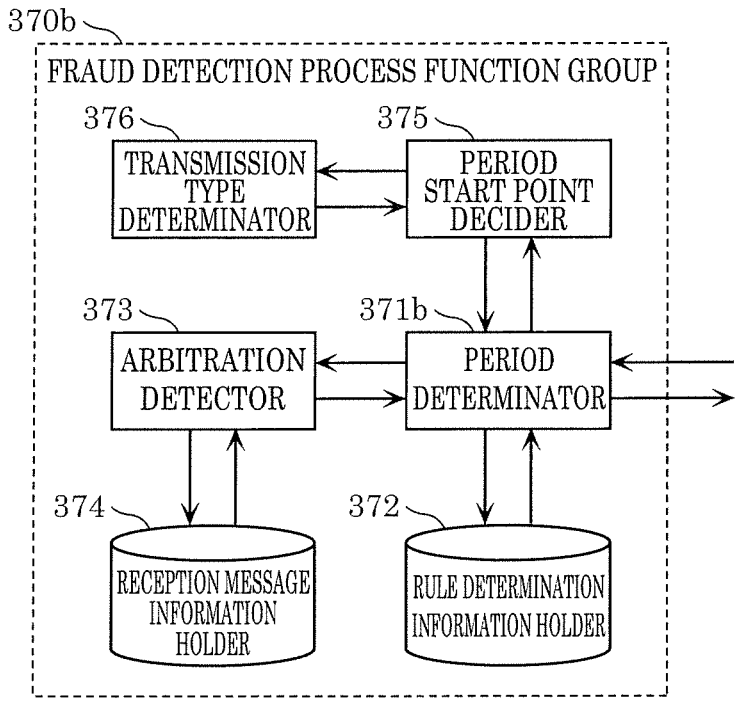
FIG. 12 is a block diagram illustrating an example of a fraud detection process function group in Embodiment 2.

FIG. 12 is a block diagram illustrating fraud detection process function group 370b in this embodiment. In FIG. 12, the same structural elements as those in FIG. 6 are given the same reference marks, and their description is omitted. Moreover, part of the same structural elements is omitted in the drawing. The differences of fraud detection process function group 370b from fraud detection process function group 370 will be mainly described below.

Fraud detection process function group 370b includes period start point decider 375 and transmission type determinator 376 in addition to the structure of fraud detection process function group 370 in Embodiment 1. Fraud detection process function group 370b includes period determinator 371b instead of period determinator 371.

These structural elements represent functions, and are achieved by the processing unit reading a program stored in the storage in gateway 300, executing the program, and recording predetermined data in the storage. Alternatively, the structural elements are achieved by, instead of recording predetermined data in the storage, transmitting/receiving data through the input/output unit. Alternatively, the structural elements are achieved by combining these two methods.

Period start point decider 375 decides a value of "last reception time" that, when period determinator 371b determines whether the period (elapsed time) with which the message is received is within a range that can be determined as normal, is used as a start point for calculating the elapsed time. In response to an inquiry from period determinator 371b, period start point decider 375 decides the value of "last reception time" used as the start point for calculating the elapsed time, and notifies period determinator 371b of the value of "last reception time".

Period start point decider 375 notifies transmission type determinator 376 of the ID of the received message, and requests transmission type determinator 376 to determine the transmission type. Period start point decider 375 decides the value of "last reception time" depending on the determination result of transmission type determinator 376.

For example, suppose there are a transmission type (A type) for which the reception time of the message (current reception time) is set as the value of "last reception time", and a transmission type (B type) for which the scheduled (expected) time of message reception (scheduled reception time), i.e. the value obtained by adding the reference elapsed time held as a rule to the last reception time, is set as the value of "last reception time".

In the case where transmission type determinator 376 determines the transmission type as A type, period start point decider 375 notifies period determinator 371b of the current reception time as the "last reception time". In the case where transmission type determinator 376 determines the transmission type as B type, period start point decider 375 notifies period determinator 371b of the scheduled reception time as the "last reception time".

Period start point decider 375 may obtain, together with the message received from period determinator 371b, information of whether arbitration occurs when the message is received, and decide the time used as the start point depending on whether arbitration occurs.

For example, in the case where no arbitration occurs when the message is received, period start point decider 375 notifies period determinator 371b of the current reception time as the "last reception time". Only in the case where arbitration occurs when the message is received, period start point decider 375 requests transmission type determinator 376 to determine the transmission type, and decides the time used as the start point depending on the transmission type by the foregoing method or the like.

Transmission type determinator 376 determines the transmission type from the ID of the received message and notifies period start point decider 375 of the transmission type, in response to an inquiry from period start point decider 375.

For example, the transmission type is determined in the following manner. Transmission type determinator 376 holds a table indicating the correspondence between IDs and transmission types beforehand, and, in response to an inquiry from period start point decider 375, determines the transmission type corresponding to the ID of the received message in the held table.

Period determinator 371b performs the same process as period determinator 371 in Embodiment 1. Upon finally determining that the received message is a normal message, period determinator 371b requests period start point decider 375 to decide the last reception time which rule determination information holder 372 is requested to hold. That is, period determinator 371b notifies rule determination information holder 372 of the last reception time notified from period start point decider 375, and requests rule determination information holder 372 to hold the last reception time.

Although the above describes the case where period start point decider 375 obtains the information of whether arbitration occurs when the message is received from period determinator 371b, this is not a limitation. For example, period start point decider 375 may obtain the information of whether arbitration occurs when the message is received, directly from arbitration detector 373.

2.2 Fraud Detection Process

Figure 13:
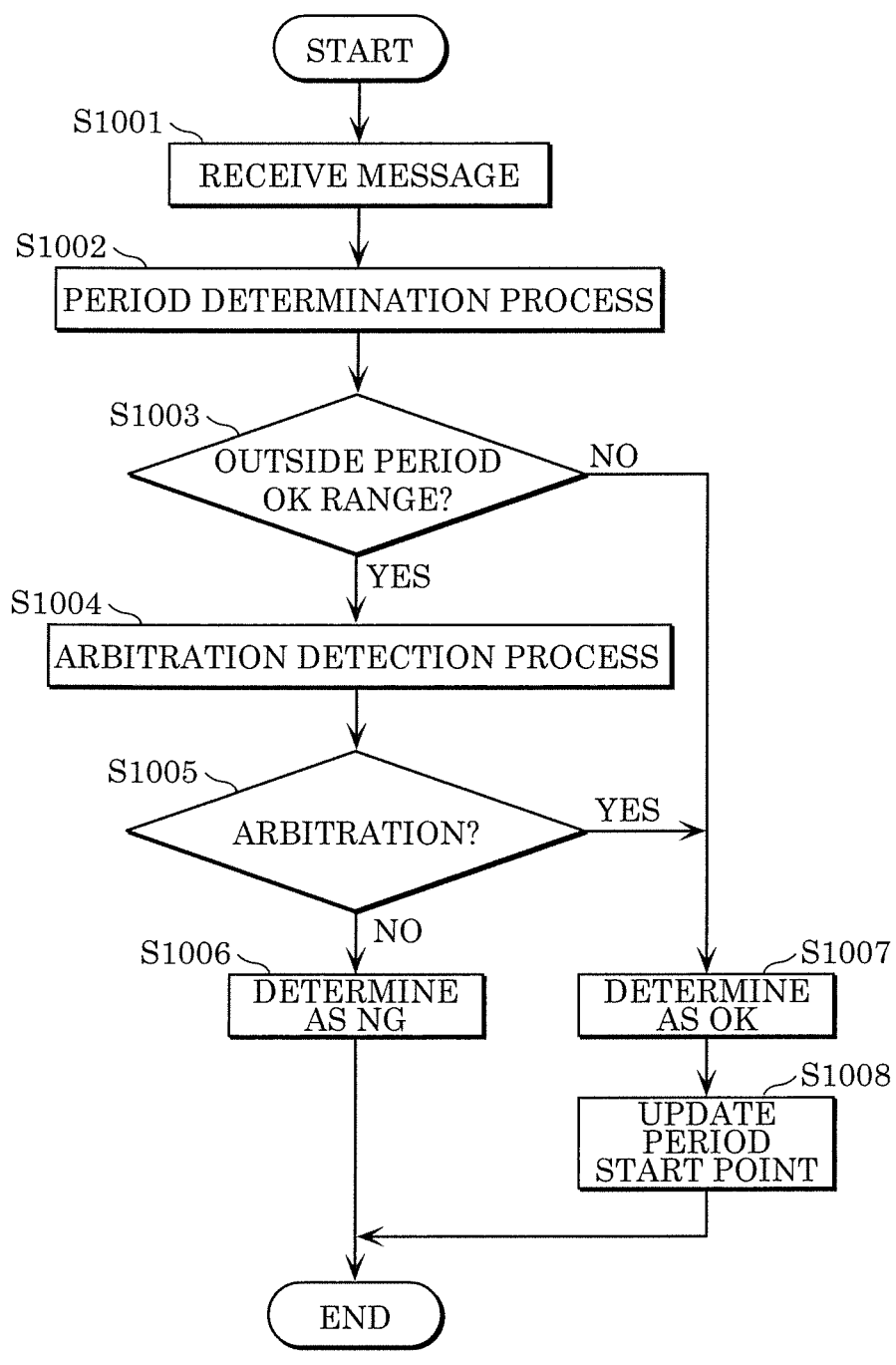
FIG. 13 is a flowchart illustrating an example of a fraud detection process in Embodiment 2.

FIG. 13 is a flowchart illustrating an example of a fraud detection process in this embodiment. In FIG. 13, the same steps as those in FIG. 10 are given the same reference marks, and their description is partly omitted.

First, period determinator 371b in fraud detection process function group 370b receives a message from frame processor 350 (Step S1001).

The processes of Steps S1002 to S1007 are the same as those in FIG. 10, and accordingly their description is omitted.

Upon determining in Step S1007 that the received message is a normal message, period determinator 371b requests period start point decider 375 to decide the last reception time. Period determinator 371b notifies rule determination information holder 372 of the last reception time notified from period start point decider 375, to update the last reception time held in rule determination information holder 372 (S1008). The fraud detection process in fraud detection process function group 370b then ends.

2.3 Advantageous Effects

According to this embodiment, in the fraud detection process in fraud detection process function group 370b, the value of "last reception time" used when period determinator 371 determines whether the period (elapsed time) with which the message is received is within a range that can be determined as normal is flexibly decided depending on the transmission type and/or whether arbitration occurs. Thus, even in the case where the transmission method differs for each ID or in the case where the period cannot be correctly detected because the transmission timing upon occurrence of arbitration is off, which can be conventionally problematic, whether the message is an anomalous message can be determined with higher accuracy. This enhances the safety of the in-vehicle network system.

3. Other Variations

The present disclosure is not limited to the foregoing embodiments. Other modifications obtained by applying various changes conceivable by a person skilled in the art to the embodiments and any combinations of the structural elements in different embodiments without departing from the scope of the present disclosure are also included in the scope of the present disclosure. For example, the following variations are included in the present disclosure.

(1) Embodiment 2 describes the case where fraud detection process function group 370b includes period determinator 371b, rule determination information holder 372, arbitration detector 373, reception message information holder 374, period start point decider 375, and transmission type determinator 376. However, the fraud detection process function group is not limited to such.

Figure 14:
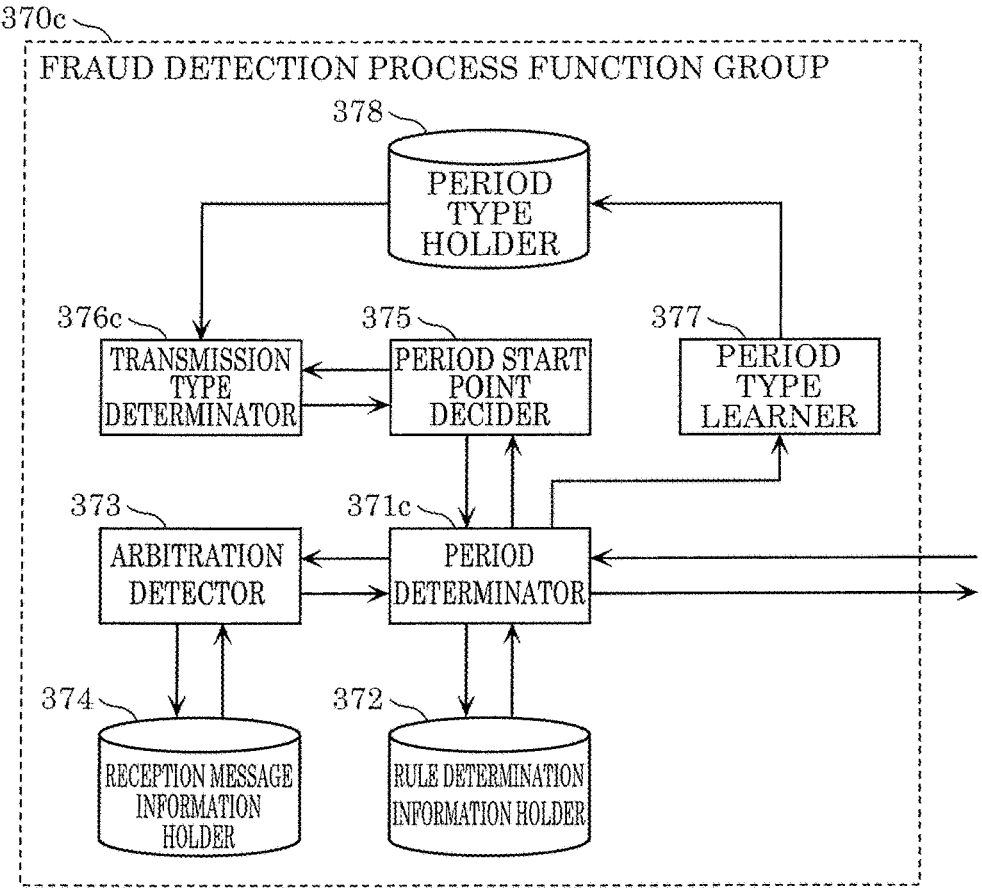
FIG. 14 is a diagram illustrating an example of a fraud detection process function group in a variation.

FIG. 14 is a diagram illustrating an example of a fraud detection process function group in a variation. As illustrated in FIG. 14, fraud detection process function group 370c includes period determinator 371c, rule determination information holder 372, arbitration detector 373, reception message information holder 374, period start point decider 375c, transmission type determinator 376c, period type learner 377, and period type holder 378.

Period type learner 377 determines the period type for each ID, based on information received from period determinator 371c. An example of the determination method is that period type learner 377 records (stores) the reception time of the received message for each ID, and, when a given number of reception times are stored, calculates, for each ID, the difference (elapsed time) of each reception time from its immediately preceding (last) reception time.

Period type learner 377 compares the reception time difference with the reference value of the elapsed time set for each ID, and determines which of the following is met: (1) the elapsed time is substantially equal to the reference value;

(2) the elapsed time is shorter than the reference value; and
(3) the elapsed time is longer than the reference value.

Predetermined thresholds (for the upper limit and the lower limit) are used in the determination of whether the elapsed time is substantially equal to the reference value. In the case where the elapsed time is within a range from the value obtained by subtracting the lower limit threshold from the reference value to the value obtained by adding the upper limit threshold to the reference value, period type learner 377 determines that the elapsed time is substantially equal to the reference value. In the case where the elapsed time is less than the value obtained by subtracting the lower limit threshold from the reference value, period type learner 377 determines that the elapsed time is shorter than the reference value. In the case where the elapsed time is greater than the value obtained by adding the upper limit threshold to the reference value, period type learner 377 determines that the elapsed time is longer than the reference value.

Period type learner 377 notifies period type holder 378 of the number of determination results (1. substantially equal to the reference value, 2. shorter than the reference value, 3. longer than the reference value) together with the ID.

Period type holder 378 holds the determination result of the period type notified from period type learner 377, and notifies transmission type determinator 376 of the period type in response to an inquiry from transmission type determinator 376. In the case where, when notified from period type learner 377, period type holder 378 already holds a determination result for the same ID as the notified ID, period type holder 378 may write the newly notified determination result over the already held determination result, or update the already held determination result with a value obtained by adding the newly notified determination result to the already held determination result.

Period determinator 371c notifies period type learner 377 of information relating to the received message that is finally determined as OK.

Transmission type determinator 376c, when requested by period start point decider 375c to determine the transmission type, obtains the result of comparison between the elapsed time at each reception timing relating to the requested ID and the reference value of the elapsed time, from period type holder 378. In the case where the number of determination results (2) shorter than the reference value is less than the number of determination results (3) longer than the reference value, transmission type determinator 376 determines that the transmission type is A type. In the case where the number of determination results (2) shorter than the reference value and the number of determination results (3) longer than the reference value are approximately the same, transmission type determinator 376 determines that the transmission type is B type. In other cases, transmission type determinator 376 determines that the transmission type cannot be determined. The determination of whether the number of determination results (2) shorter than the reference value is less than the number of determination results (3) longer than the reference value may be performed by determining whether the numbers of determination results differ by a predetermined number or more, or by determining whether the ratio of the numbers of determination results is less than a predetermined value. The proportion of each of (1) substantially equal to the reference value, (2) shorter than the reference value, and (3) longer than the reference value may be calculated, and whether the proportions differ by a predetermined value or more may be determined. The determination of whether the number of determination results (2) shorter than the reference value and the number of determination results (3) longer than the reference value are approximately the same may be performed by determining whether the numbers of determination results differ by a predetermined number or less, or by determining whether the ratio of the numbers of determination results is greater than a predetermined value or is within a predetermined range. The proportion of each of (1) substantially equal to the reference value, (2) shorter than the reference value, and (3) longer than the reference value may be calculated, and whether the proportions differ by a predetermined value or less may be determined.

Transmission type determinator 376c notifies period start point decider 375c of the determination result, in response to a request from period start point decider 375c. In the case where the transmission type cannot be determined, transmission type determinator 376c notifies period start point decider 375c of a predetermined type.

Although the above describes the case where period type learner 377 records the reception time of the received message for each ID and, when a given number of reception times are stored, calculates the difference (elapsed time) of each reception time from its immediately preceding (last) reception time for each ID, this is not a limitation.

For example, period type learner 377 may have a time for learning each period type before factory shipment of the vehicle, and, during the time, store the reception time of each received message and calculate the difference (elapsed time) of each reception time from its immediately preceding reception time for each ID.

Period type learner 377 may store each reception time after factory shipment, and, when a given number of reception times are stored or when reception times are stored for a given time, calculate the difference (elapsed time) of each reception time from its immediately preceding reception time for each ID.

Period type learner 377 may be instructed to store the reception time of each message by a device outside the vehicle, store each reception time, and, when a given number of reception times are stored or when reception times are stored for a given time until instructed to stop storing the reception time by the outside device, calculate the difference (elapsed time) of each reception time from its immediately preceding reception time for each ID.

Period type learner 377 may record the reception time each time a message is received, and, after storing a given number of reception times or storing reception times for a given time, calculate the difference (elapsed time) of the reception time from its immediately preceding reception time each time a message is received.

Although the above describes the case where period type learner 377 records each reception time and, at certain timing, calculate the difference (elapsed time) of each reception time from its immediately preceding reception time for each ID, this is not a limitation. For example, period type learner 377 may, each time a message is received, calculate the difference (elapsed time) of the reception time from the reception time of the last message, record (store) the elapsed time, and record the latest reception time.

Although the above describes the case where predetermined thresholds (for the upper limit and the lower limit) are used in the determination of whether the elapsed time is substantially equal to the reference value, this is not a limitation. For example, one threshold may be used so that the lower limit and the upper limit are the same value. Moreover, two values of a lower limit value and an upper limit value may be used instead of a combination of a reference value and a threshold.

Although the above describes the case where period type learner 377 notifies period type holder 378 of the number of determination results ((1) substantially equal to the reference value, (2) shorter than the reference value, (3) longer than the reference value), this is not a limitation. For example, period type learner 377 may notify the proportion, or, if a value is already held in period type holder 378, notify a number obtained by adding the current value to the held value.

Thus, the transmission type can be determined automatically, without setting the transmission type beforehand. Even in the case where an ECU is replaced due to repair or the like, the transmission type can be determined automatically. Hence, the fraud detection accuracy can be further improved, and the processing cost or the manufacturing cost can be reduced.

(2) Embodiment 2 describes the case where fraud detection process function group 370b includes period determinator 371b, rule determination information holder 372, arbitration detector 373, reception message information holder 374, period start point decider 375, and transmission type determinator 376. However, the fraud detection process function group is not limited to such.

Figure 15:
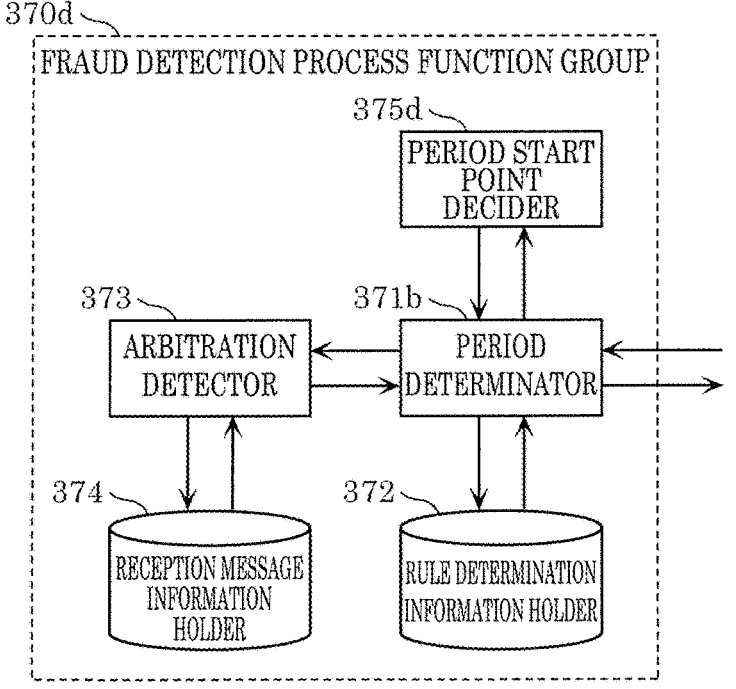
FIG. 15 is a diagram illustrating an example of a fraud detection process function group in a variation.

FIG. 15 is a diagram illustrating an example of a fraud detection process function group in a variation. As illustrated in FIG. 15, fraud detection process function group 370d includes period determinator 371b, rule determination information holder 372, arbitration detector 373, reception message information holder 374, and period start point decider 375d.

Period start point decider 375d decides the start point of the period, depending on whether arbitration occurs when the message is received. For example, in the case where no arbitration occurs, period start point decider 375d notifies period determinator 371b of the current reception time as the "last reception time". In the case where arbitration occurs, period start point decider 375d notifies period determinator 371b of the scheduled reception time as the "last reception time".

Although the above describes the case where period start point decider 375d notifies period determinator 371b whether the current reception time or the scheduled reception time is the "last reception time", this is not a limitation.

For example, period start point decider 375d may notify period determinator 371b of the current reception time as the "last reception time" the first time arbitration occurs, and subsequently notify period determinator 371b of a time closer to the scheduled reception time by a predetermined time or at a predetermined rate as the "last reception time" each time arbitration occurs successively. Period start point decider 375d may notify period determinator 371b of a time closer to the scheduled reception time as the "last reception time", from the first time arbitration occurs.

Period start point decider 375d may, for each ID, calculate beforehand how much the time to be notified to period determinator 371b as the "last reception time" is closer to the scheduled reception time from the current reception time, using a statistical value such as skewness or kurtosis. Period start point decider 375d may then notify period determinator 371b of the time closer to the scheduled reception time from the current reception time by the value calculated beforehand, as the "last reception time".

Not only skewness or kurtosis but also values such as median, mean, a value determined from mode, and a standard deviation may be used to decide how much the time to be notified as the "last reception time" is closer to the scheduled reception time from the current reception time.

These values may be used individually, or a value calculated from some of the values may be used. Period type learner 377 may learn these values.

Thus, the last time can be decided more flexibly than in an either-or situation, so that detection accuracy can be improved.

(3) Each of the foregoing embodiments describes the case where ECU 100 includes frame transmitter/receiver 110, frame interpreter 120, reception ID determinator 130, reception ID list holder 140, frame processor 150, data obtainer 170, and frame generator 180. However, the structure of ECU 100 in the in-vehicle network system according to the present disclosure is not limited to such.

Figure 16:
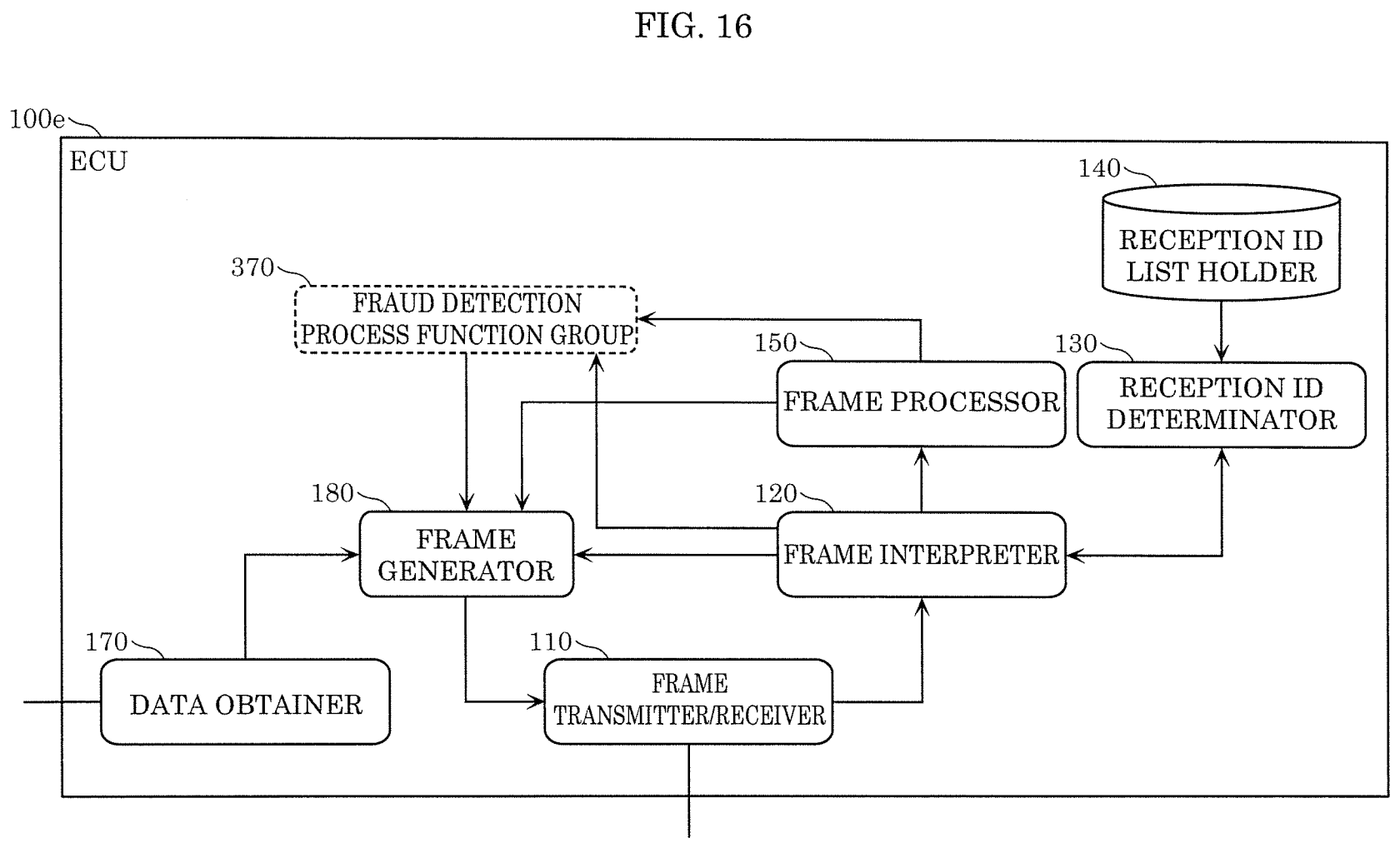

FIG. 16 is a block diagram illustrating an example of an ECU in a variation. ECU 100e illustrated in FIG. 16 further includes fraud detection process function group 370. In this case, fraud detection process function group 370 may be requested to determine whether the message is an anomalous message, by frame processor 150 or frame interpreter 120.

Figure 17:
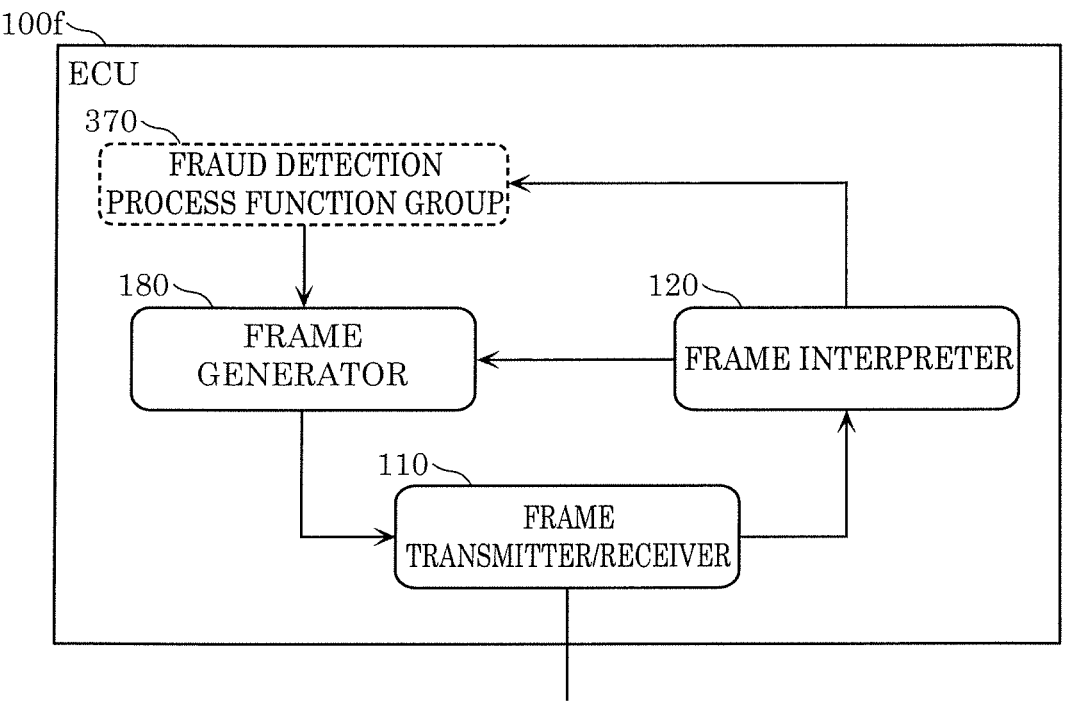
FIG. 17 is a block diagram illustrating an example of an ECU in a variation.

FIG. 17 is a block diagram illustrating an example of an ECU in a variation. ECU 100f illustrated in FIG. 17 includes frame transmitter/receiver 110, frame interpreter 120, and frame generator 180. In this case, for example, frame interpreter 120 may receive every message regardless of the ID, and request fraud detection process function group 370 to determine, for every message, whether the message is an anomalous message.

ECU 100f may include reception ID determinator 130 and reception ID list holder 140 in addition to the structure in FIG. 17, receive only each message having a message ID in the reception ID list held in the reception ID list holder, and request fraud detection process function group 370 to determine whether the message is an anomalous message. Fraud detection process function group 370 may be replaced with any of fraud detection process function groups 370a to 370d.

Thus, not only the gateway but also ECU 100 can determine whether the message transmitted to the bus is an anomalous message. For example, this improves redundancy in the fraud detection mechanism in the in-vehicle network system, and ensures higher safety.

Figure 18:
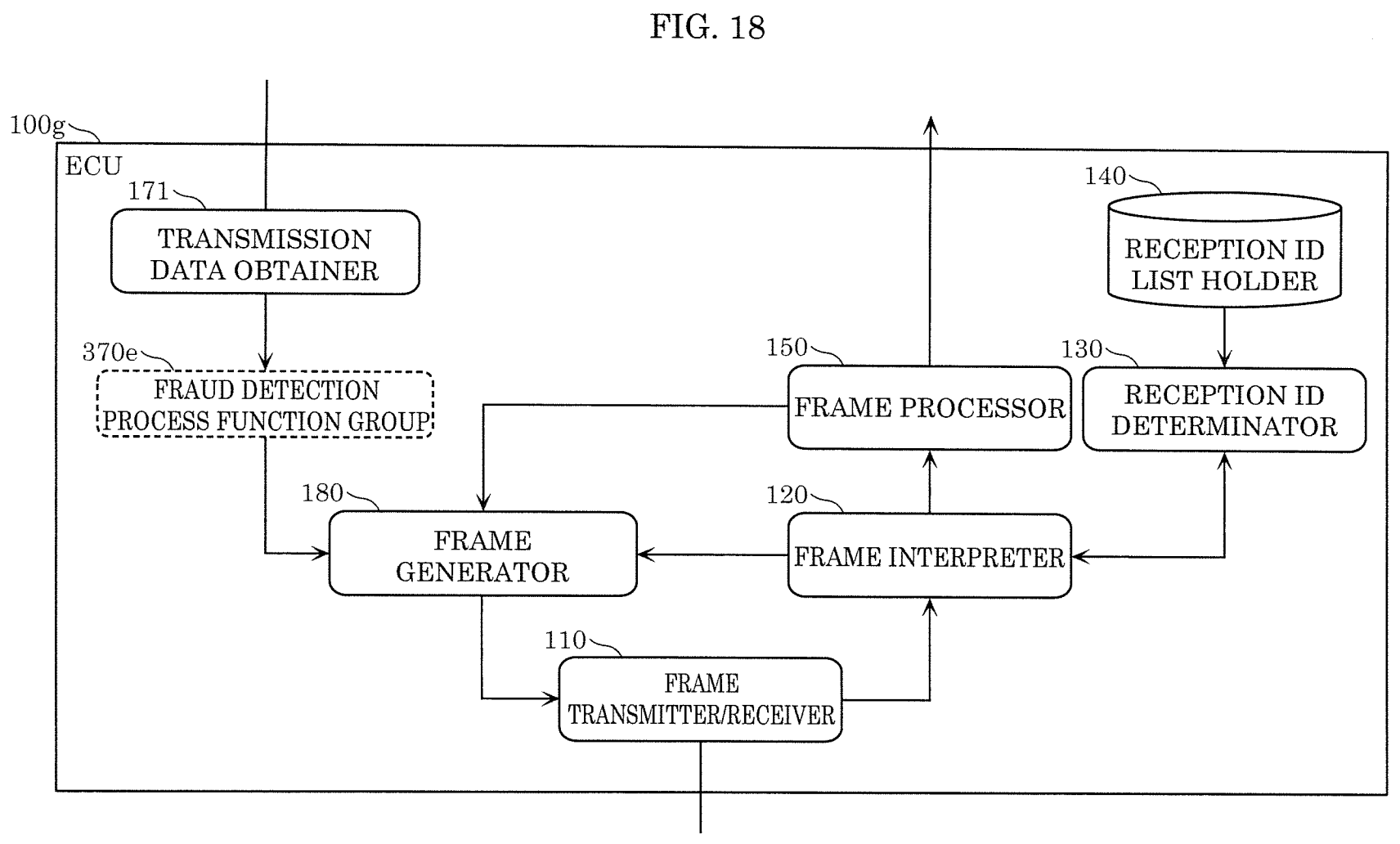

FIG. 18 is a block diagram illustrating an example of an ECU in a variation. ECU 100g illustrated in FIG. 18 may include transmission data obtainer 171 that obtains data transmitted to bus 200, from another connected device, the outside, or the like. Fraud detection process function group 370e in ECU 100g may also determine whether the data received from transmission data obtainer 171 is an anomalous message, and request frame generator 180 to transmit the message only in the case where the data is determined as not an anomalous message. The structure of fraud detection process function group 370e may be the same as that of any of fraud detection process function groups 370, 370a, 370b, 370c, and 370d.

Thus, for example in the case where ECU 100f used together with a car navigation system receives an anomalous message from the car navigation system that has been taken over, the distribution of the message in the network can be prevented. Moreover, an anomalous message which a party outside the vehicle attempts to transmit to the in-vehicle network system can be prevented from entering the in-vehicle network system.

(4) Each of the foregoing embodiments describes the case where the action corresponding to fraud detection is to not transfer the received message. However, the action is not limited to such. For example, the gateway or ECU 100 including the foregoing fraud detection process function group may perform a fraud detection process during message reception, and, upon determining that the message is an anomalous message, transmit an error frame to nullify the message being received in the network.

Thus, another ECU 100 connected to a bus in which an anomalous message is found can be prevented from receiving the anomalous message. The same action is also applicable to messages that are not transferred.

Gateway 300 or ECU 100 including the foregoing fraud detection process function group may notify fraud to the user, an external server, or the like, record fraud in a log, or transition to fail-safe mode of the vehicle.

Thus, flexible measures can be taken after fraud detection. Further, a plurality of messages determined as anomalous messages may be treated as one or more sequences of data, and the data value or reception interval set for each sequence may be learned as a fraudulent label.

(5) Each of the foregoing embodiments describes an example of IDs in a standard format, but the presently disclosed technique is equally applicable to IDs in an extended format.

(6) Each of the foregoing embodiments describes an example in which a message is transmitted as plaintext, but the message may be encrypted. Moreover, the message may include a message authentication code.

(7) Each of the foregoing embodiments describes an example in which the normal model and the reception log are held as plaintext, but they may be held in encrypted form.

(8) Each of the foregoing embodiments describes an example in which the network communication system that performs communication according to the CAN protocol is an in-vehicle network, but the presently disclosed technique is not limited to in-vehicle networks, and may be used in network communication systems that perform communication according to the CAN protocol other than in-vehicle networks, such as networks of robots, industrial devices, etc.

Although the CAN protocol is used in in-vehicle network system 10, this is not a limitation. For example, CAN-FD (CAN with Flexible Data Rate), FlexRay, Ethernet, LIN (Local Interconnect Network), MOST (Media Oriented Systems Transport), or the like may be used. A network in which these networks are combined as sub-networks may also be used.

(9) Each device in the foregoing embodiments is specifically a computer system including a microprocessor, read-only memory (ROM), random access memory (RAM), a hard disk unit, a display unit, a keyboard, a mouse, or the like. A computer program is recorded in the RAM or hard disk unit. The device achieves its functions by the microprocessor operating according to the computer program. The computer program is configured by combining multiple command codes indicating instructions to the computer, to achieve predetermined functions.

(10) Part or all of the structural elements constituting each device in the foregoing embodiments may be configured as a single system large scale integration (LSI). A system LSI is a super-multifunctional LSI manufactured integrating multiple components on a single chip, and specifically is a computer system including a microprocessor, ROM, RAM, and so forth. A computer program is recorded in the RAM. The system LSI achieves its functions by the microprocessor operating according to the computer program.

The parts of the structural elements constituting each device may be individually formed into one chip, or part or all thereof may be included in one chip.

While description has been made regarding a system LSI, there are different names such as integrated circuit (IC), LSI, super LSI, and ultra LSI, depending on the degree of integration. The circuit integration technique is not limited to LSIs, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(11) Part or all of the structural elements constituting each device may be configured as an IC card detachably mountable to the device or a standalone module. The IC card or module is a computer system including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(12) The present disclosure may be the above-described methods, or may be a computer program which realizes these methods by a computer, or may be digital signals made up of the computer program.

The present disclosure may be the computer program or the digital signals recorded in a computer-readable recording medium, such as flexible disk, hard disk, CD-ROM, MO, DVD, DVD-ROM, DVD-RAM, Blu-ray® disc (BD), or semiconductor memory. The present disclosure may also be the digital signals recorded in these recording mediums.

The present disclosure may be an arrangement where the computer program or the digital signals are transmitted over an electric communication line, a wireless or wired communication line, a network such as the Internet, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

(13) The foregoing embodiments and variations may be combined in any way.

The technique for deciding a message used as a basis of detection of fraudulent communication intended for fraudulent control by an anomalous message in an in-vehicle network according to one or more aspects has been described above by way of embodiments and variations. In these embodiments and variations, a message used as a basis of fraudulent communication detection is decided by a gateway or an ECU that is connected to the in-vehicle network system and perform communication or a combination of the gateway or ECU and a server computer. A system that includes one or more processors and a storage and performs such fraudulent communication detection is referred to as "fraudulent communication detection basis decision system" in the present disclosure. The fraudulent communication detection basis decision system may be implemented by one device, such as a gateway connected to the in-vehicle network system, or implemented by a plurality of devices, such as a combination of a gateway and an ECU or a combination of the gateway or the ECU and a remote server computer.

The technique may also be implemented as a method including all or part of the steps of the processes performed by the structural elements in each of the foregoing embodiments and variations, or as a program executed by a processor of the fraudulent communication detection basis decision system to cause the fraudulent communication detection basis decision system to perform the method.

In each of the foregoing embodiments and variations, processes performed by specific structural elements may be performed by other structural elements instead of the specific structural elements. Moreover, a plurality of processes may be changed in order, and a plurality of processes may be performed in parallel.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The presently disclosed technique is applicable to an in-vehicle network system and the like.

What is claimed is:

1. A non-transitory computer-readable recording medium having recorded thereon a computer program for causing a computer to execute a fraud detection method for detecting an anomalous message in an in-vehicle network, executed by a computer, the fraud detection method comprising:

receiving a first message transmitted in the in-vehicle network, the first message being scheduled to be received at a scheduled time that is an elapsed time from a reception time of a second message received last before the first message, the second message being with a same data type as the first message;

assessing whether a condition 1 is met, the condition 1 being that a reception time of the first message is within a predetermined range, the predetermined range including the scheduled time;

assessing whether a condition 2 is met, the condition 2 being that arbitration occurs when receiving the first message, the arbitration being that one or more consecutive third messages and the first message following the one or more consecutive third messages are received at less than or equal to a time interval set beforehand;

assessing whether a condition 3 is that (a) a start time of the arbitration is earlier than an upper limit of the predetermined range or that (b) the start time of the arbitration is equal to or later than the upper limit of the predetermined range, the start time of the arbitration being a reception time of a message with an earliest reception time among the one or more consecutive third messages;

determining that the first message is a normal message, when the condition 1 is met and the condition 2 is not met;

determining that the first message is a normal message, when the condition 1 is not met, the condition 2 is met and the condition 3 is (a);

determining that the first message is an anomalous message, when the condition 1 is not met, the condition 2 is met and the condition 3 is (b); and determining that the first message is an anomalous message, when the condition 1 is not met and the condition 2 is not met, wherein the fraud detection method further comprises:

deciding a start point for calculating a scheduled time of a fourth message received immediately after the first message in accordance with information about the first message, the fourth message being with the same data type as the first message; and determining whether a reception time of the fourth message is within a second predetermined range including the scheduled time of the fourth message that is an elapsed time from the start point.

2. The non-transitory computer-readable recording medium according to claim 1, wherein the fraud detection method further comprises: deciding either the reception time of the first message or the scheduled time of the first message as the start point.

3. The non-transitory computer-readable recording medium according to claim 2, wherein the fraud detection method further comprises: determining a transmission type of the first message, wherein in the deciding, the start point is decided depending on the transmission type.

4. The non-transitory computer-readable recording medium according to claim 2, wherein in the deciding, the start point is decided to be either the reception time of the first message or the scheduled time of the first message in accordance with a difference between the reception time of the first message and the reception time of the second message.

5. The non-transitory computer-readable recording medium according to claim 2, wherein the fraud detection method further comprises:

classifying, into at least two types, differences, the differences each being a difference between reception times of two adjacent messages among a plurality of fifth messages that have the same data type as the first message and are received before the first message, wherein in the deciding, the start point is decided to be either the reception time of the first message or the scheduled time of the first message in accordance with a number of differences classified into each of the at least two types.

6. The non-transitory computer-readable recording medium according to claim 5, wherein in the classifying, comparing the difference between the reception times of the two adjacent messages among the plurality of fifth messages with a reference value, wherein in the deciding, the start point is decided to be either the reception time of the first message or the scheduled time of the first message in accordance with a number of cases where the difference is shorter than the reference value and a number of cases where the difference is longer than the reference value.

7. The non-transitory computer-readable recording medium according to claim 6, wherein in the deciding, the start point is decided to be the reception time of the first message, when the number of cases in which the difference is shorter than the reference value is smaller than the number of cases in which the difference is longer than the reference value, the start point is decided to be the scheduled time of the first message, when the number of cases in which the difference is shorter than the reference value and the number of cases in which the difference is longer than the reference value are substantially the same.

8. The non-transitory computer-readable recording medium according to claim 7, wherein in the deciding, the start point is decided to be the reception time of the first message, when a first number of cases in which the difference is shorter than the reference value is smaller than a second number of cases in which a difference is longer than the reference value, and the difference between the first number and the second number is not less than a predetermined number.

9. The non-transitory computer-readable recording medium according to claim 7, wherein in the deciding, the start point is decided to be the reception time of the first message, when a first number of cases in which the difference is shorter than the reference value is smaller than a second number of cases in which the difference is longer than the reference value, and a ratio of the first number to the second number is less than a predetermined value.

10. The non-transitory computer-readable recording medium according to claim 7, wherein in the deciding, the start point is decided to be the scheduled time of the first message, when a first number of cases in which the difference is shorter than the reference value and a second number of cases in which a difference is longer than the reference value are substantially the same, and the difference between the first number and the second number is within a predetermined number.

11. The non-transitory computer-readable recording medium according to claim 7, wherein in the deciding, the start point is decided to be the scheduled time of the first message, when a first number of cases in which the difference is shorter than the reference value and a second number of cases in which the difference is longer than the reference value are substantially the same, and a ratio of the first number to the second number is greater than a predetermined value or is within a third predetermined range.

12. The non-transitory computer-readable recording medium according to claim 2, wherein in the deciding, the start point is decided to be either the reception time of the first message or the scheduled time of the first message in accordance with a plurality of sixth messages, the plurality of sixth messages being with the same data type as the first message, and the plurality of sixth messages being received a predetermined number of times or a predetermined time before the first message.

13. The non-transitory computer-readable recording medium according to claim 1, wherein in the deciding, the start point is decided depending on whether arbitration occurs when receiving the first message.

14. The non-transitory computer-readable recording medium according to claim 13, wherein in the deciding, the start point is decided to be either the reception time of the first message or the scheduled time of the first message depending on whether arbitration occurs when receiving the first message.

15. The non-transitory computer-readable recording medium according to claim 13, wherein in the deciding, the start point is decided to be the scheduled time of the first message in the case where arbitration occurs when receiving the first message, and the start point is decided to be the reception time of the first message in the case where arbitration does not occur when receiving the first message.

16. The non-transitory computer-readable recording medium according to claim 13, wherein in the deciding, the start point is decided to be a time closer to the scheduled reception time of the first message from the reception time of the first message by a predetermined time or at a predetermined rate in the case where arbitration occurs when receiving the first message, and the start point is decided to be the reception time of the first message in the case where arbitration does not occur when receiving the first message.

17. The non-transitory computer-readable recording medium according to claim 13, wherein in the deciding, in the case where arbitration occurs when receiving the first message, the start point is decided to be the reception time of the first message when a first time arbitration occurs, the start point is decided to be a time closer to the scheduled reception time of the first message from the reception time of the first message by a predetermined time or at a predetermined rate when arbitration occurs successively, and in the case where arbitration does not occur when receiving the first message, the start point is decided the reception time of the first message.

18. The non-transitory computer-readable recording medium according to claim 16, wherein the predetermined time or the predetermined rate is calculated from a statistical value of skewness or kurtosis by accumulating reception times of messages sent to the in-vehicle network for each type of data and using the accumulated reception times.

19. The non-transitory computer-readable recording medium according to claim 16, wherein the predetermined time or the predetermined rate is calculated from a median, a mean, a mode, or a standard deviation by accumulating reception times of messages sent to the in-vehicle network for each type of data and using the accumulated reception times.

20. The non-transitory computer-readable recording medium according to claim 18, wherein the predetermined time or at the predetermined rate is calculated by learning the accumulated reception times.

21. A fraud detection device that detects an anomalous message in an in-vehicle network, the fraud detection device comprising:

one or more hardware processors; and a non-transitory storage, wherein the one or more processors, using the storage:

receive a first message transmitted in the in-vehicle network, the first message being scheduled to be received at a scheduled time that is an elapsed time from a reception time of a second message received last before the first message, the second message being with a same data type as the first message;

assess whether a condition 1 is met, the condition 1 being that a reception time of the first message is within a predetermined range, the predetermined range including the scheduled time;

assess whether a condition 2 is met, the condition 2 being that arbitration occurs when receiving the first message, the arbitration being that one or more consecutive third messages and the first message following the one or more consecutive third messages are received at less than or equal to a time interval set beforehand;

assess whether a condition 3 is that (a) a start time of the arbitration is earlier than an upper limit of the predetermined range or that (b) the start time of the arbitration is equal to or later than the upper limit of the predetermined range, the start time of the arbitration being a reception time of a message with an earliest reception time among the one or more consecutive third messages;

determine that the first message is a normal message, when the condition 1 is met and the condition 2 is not met;

determine that the first message is a normal message, when the condition 1 is not met, the condition 2 is met and the condition 3 is (a);

determine that the first message is an anomalous message, when the condition 1 is not met, the condition 2 is met and the condition 3 is (b); and determine that the first message is an anomalous message, when the condition 1 is not met and the condition 2 is not met, wherein the one or more hardware processors further:

decide a start point for calculating a scheduled time of a fourth message received immediately after the first message in accordance with information about the first message, the fourth message being with the same data type as the first message; and determine whether a reception time of the fourth message is within a second predetermined range including the scheduled time of the fourth message that is an elapsed time from the start point.

* * * * *